(12) United States Patent
Grusche

(10) Patent No.: US 10,805,582 B2
(45) Date of Patent: Oct. 13, 2020

(54) METHOD AND DEVICE FOR GENERATING AND DECODING SPECTRALLY ENCODED IMAGES

(71) Applicant: Sascha Grusche und Christoph Knappe, Research and Development GbR, Munich (DE)

(72) Inventor: Sascha Grusche, Weingarte (DE)

(73) Assignee: Sascha Grusche, Garching (DE)

( * ) Notice: Subject to any disclaimer, the term of this patent is extended or adjusted under 35 U.S.C. 154(b) by 16 days.

(21) Appl. No.: 16/305,690

(22) PCT Filed: Jun. 2, 2017

(86) PCT No.: PCT/EP2017/063566
§ 371 (c)(1),
(2) Date: May 15, 2019

(87) PCT Pub. No.: WO2017/207804
PCT Pub. Date: Dec. 7, 2017

(65) Prior Publication Data
US 2020/0021784 A1 Jan. 16, 2020

(30) Foreign Application Priority Data
Jun. 2, 2016 (DE) .................. 10 2016 110 197

(51) Int. Cl.
*H04N 9/31* (2006.01)
*G02B 5/04* (2006.01)
*G02B 5/18* (2006.01)

(52) U.S. Cl.
CPC ............ *H04N 9/3182* (2013.01); *G02B 5/04* (2013.01); *G02B 5/1842* (2013.01); *H04N 9/3108* (2013.01)

(58) Field of Classification Search
CPC ...... H04N 9/3182; H04N 9/3108; G02B 5/04; G02B 5/1842
See application file for complete search history.

(56) References Cited

U.S. PATENT DOCUMENTS

| 3,924,925 A | 12/1975 | Gale et al. |
| 4,939,645 A | 7/1990 | Hopkinson |
| 2016/0065915 A1 | 3/2016 | Potter et al. |

FOREIGN PATENT DOCUMENTS

| DE | 1 57 037 A1 | 10/1982 |
| DE | 39 17 362 A1 | 3/1990 |
| DE | 10 2013 022 156 A1 | 7/2015 |

OTHER PUBLICATIONS

Kang et al., "Spectrally-encoded color imaging", Opt Express. Aug. 17, 2009; 17(17): 15239-15247.*

(Continued)

*Primary Examiner* — Michael E Teitelbaum
(74) *Attorney, Agent, or Firm* — Posz Law Group, PLC

(57) ABSTRACT

A method for generating a spectrally encoded image from an original image includes at least one first transformation step, in which at least one first original image parameter is encoded into at least one first image parameter, which is dependent on at least one spectral coordinate of the spectrally encoded image,
wherein the method includes at least one second transformation step, in which at least one second original image parameter is encoded into at least one second image parameter that is dependent on the spectral coordinate of the spectrally encoded image.
This allows for generation of true-color spectral images.

9 Claims, 10 Drawing Sheets

(56) References Cited

OTHER PUBLICATIONS

Figure 1:
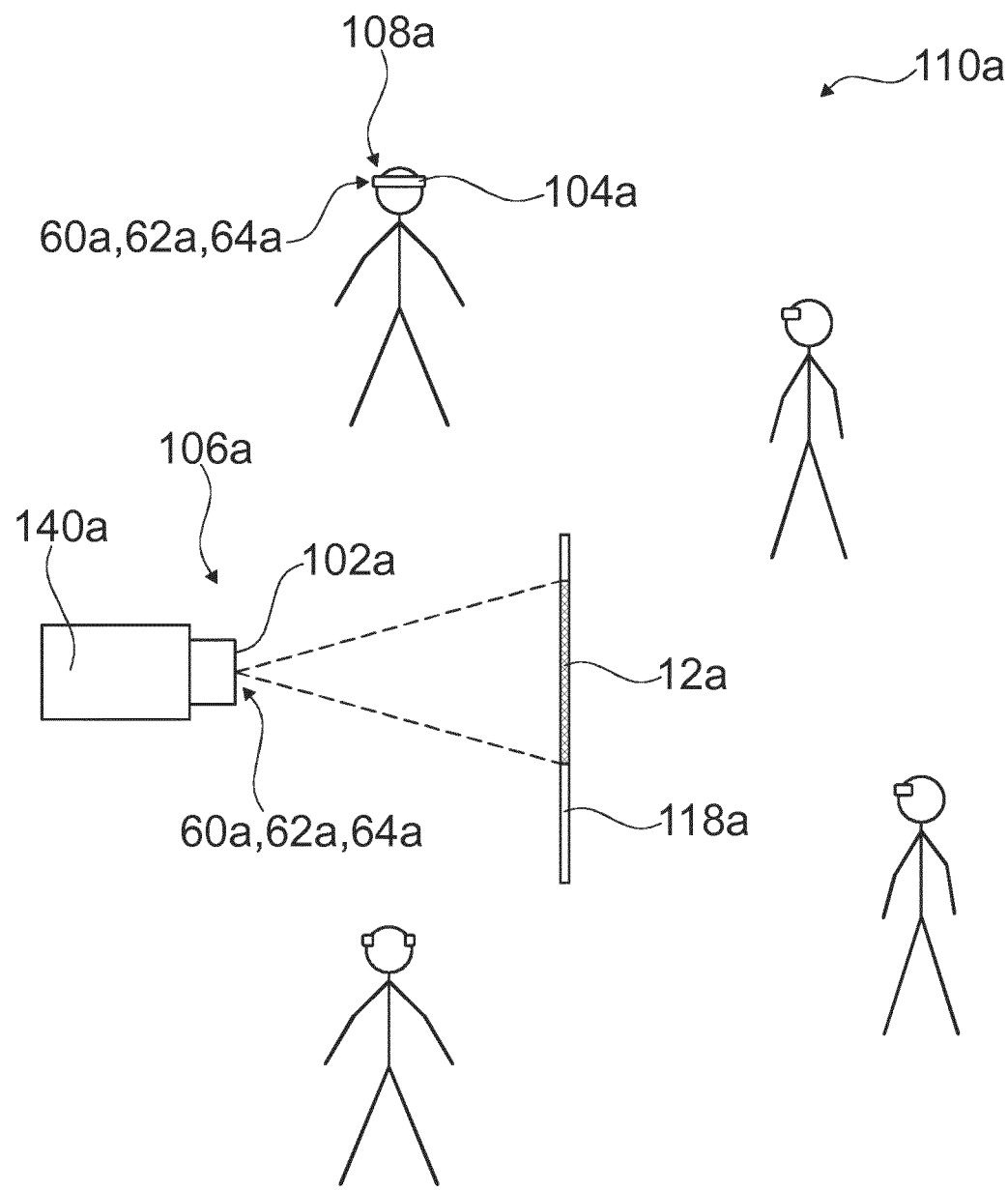

Search Report dated Mar. 2, 2017 issued in corresponding DE patent application No. 10 2016 110 197.4 (and partial English translation).
International Search Report dated Aug. 9, 2017 issued in corresponding International Patent Application No. PCT/EP2017/063566 (English translation only).
International Preliminary Report on Patentability dated Sep. 26, 2018 issued in corresponding International Patent Application No. PCT/EP2017/063566 (English translation only).
Sascha Grusche, "Spectral synthesis provides two-dimensional videos on a one-dimensional screen with 360°-visibility and mirror-immunity," Applied Optics, 53, 2014, pp. 674-684.
Sascha Grusche, "Basic slit spectroscope reveals three-dimensional scenes through diagonal slices of hyperspectral cubes," Applied Optics, 53, 2014, pp. 4594-4603.

\* cited by examiner

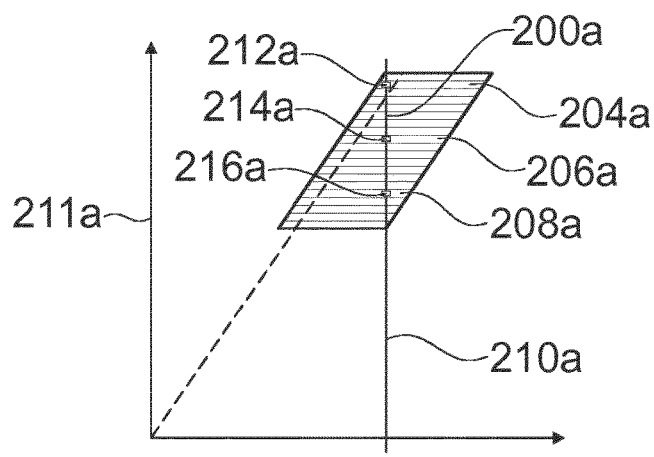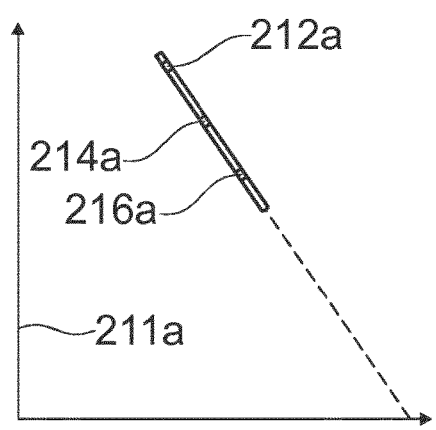
Fig. 5a            Fig. 5b
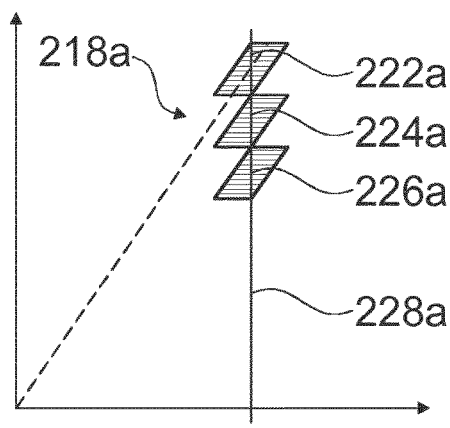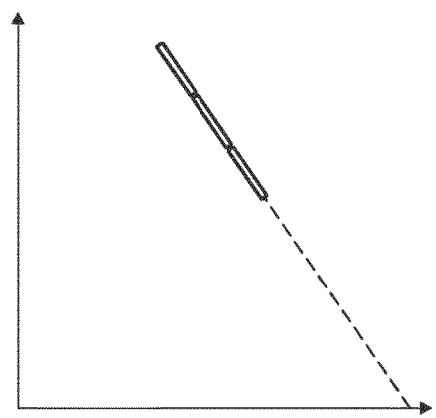
Fig. 6a            Fig. 6b
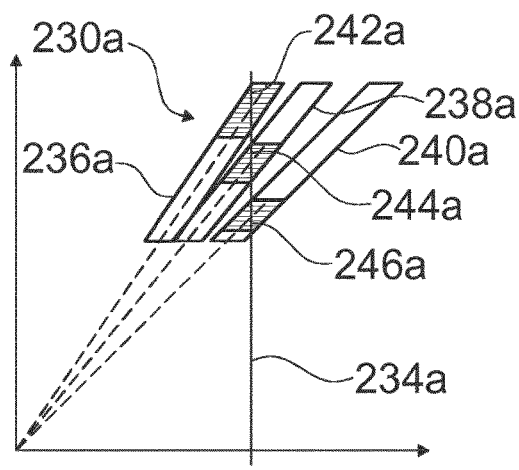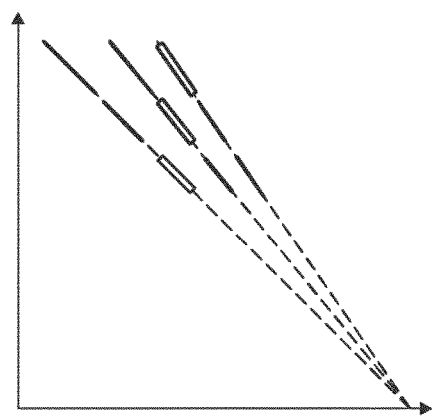
Fig. 7a            Fig. 7b

METHOD AND DEVICE FOR GENERATING AND DECODING SPECTRALLY ENCODED IMAGES

CROSS REFERENCE TO RELATED APPLICATIONS

This application is a U.S. national stage application of PCT/EP2017/063566 filed on Jun. 2, 2017, which is based on German Patent Application No. 10 2016 110 197.4 filed on Jun. 2, 2016, the contents of which are incorporated herein by reference.

STATE OF THE ART

The invention relates to a method for generating a spectrally encoded image from an original image, according to the claims, as well as a method for decoding a spectrally encoded image for the purpose of generating a copy image of an original image according to the claims. The invention further relates to an encoding device according to the claims and to a decoding device according to the claims.

Conventional projection systems require a two-dimensional projection screen. From DE 10 2013 022 156 A1 it is known that a spectrally coded projection allows translating a spatial dimension of the two-dimensional image into a spectral dimension. It is in this way possible to translate the image, implemented as a light line, onto a one-dimensional screen. For this purpose a grayscale image is projected across a one-dimensional screen through a dispersive element. When the light line generated on the projection screen is in turn viewed through a dispersive element, a rainbow-colored version of the grayscale original image appears. This rainbow-colored spectral image is visible all around the light line and remains in a correct orientation, even if the light bundle is mirrored by the projector or by the projection screen.

The objective of the invention is in particular to provide generic methods with advantageous characteristics regarding image generation. The objective is achieved according to the invention by the features of the independent claims, while advantageous implementations and further developments of the invention may be gathered from the dependent claims.

Advantages of the Invention

The invention is based on a method for generating a spectrally encoded image from an original image, with at least one first transformation step, in particular a first encoding step, in which at least one first original image parameter, which is in particular dependent on at least one spatial coordinate, advantageously an x-coordinate, of the original image, is encoded into at least one first image parameter, which is dependent on at least one spectral coordinate of the spectrally encoded image.

It is proposed that the method comprises at least one second transformation step, in particular a second encoding step, in which at least one second original image parameter, which is in particular dependent on the spatial coordinate of the original image, is encoded into at least one second image parameter that is dependent on the spectral coordinate of the spectrally encoded image.

By a method according to the invention, advantageous characteristics regarding an image-generation, in particular a generation of a spectrally encoded image, are achievable. It is furthermore advantageously possible to encode image information in an efficient fashion. Moreover a true-coloring of an image may be preserved at least partially, in particular at least approximately completely. It is advantageously possible to generate an image that is capable of being viewed from different angles, in particular in a roundabout fashion, and that in particular has true colors. Advantageously an indepedency from a projector is also made possible. Beyond this a mirror-immunity is achieved.

The invention is further based on a method for decoding a spectrally encoded image for the purpose of generating a copy image of an original image, with at least one first transformation step, in particular a first decoding step, in which at least one first copy image parameter, which is in particular dependent on at least one spatial coordinate, advantageously an x-coordinate, of the copy image, is decoded from at least one first image parameter, which is dependent on at least one spectral coordinate of the spectrally encoded image.

It is proposed that the method comprises at least one second transformation step, in particular a second decoding step, in which at least one second copy image parameter, which is in particular dependent on the spatial coordinate of the copy image, is decoded from at least one second image parameter, which is dependent on the spectral coordinate of the spectrally encoded image.

By a method according to the invention advantageous characteristics are achievable regarding an image generation, in particular a generation of a spectrally decoded image. It is furthermore advantageously possible to decode image information in an efficient fashion. Moreover a true-coloring of an image may be preserved at least partially, in particular at least approximately completely. Advantageously it is possible to decode and/or view an image, in particular a true-color image, which is capable of being viewed from different angles, in particular from all around. Furthermore an independency regarding a projector is advantageously made possible. Moreover a mirror-immunity is achievable. It is also advantageously possible to generate a seemingly floating and/or partially transparent virtual image.

In the following, "the method" will be referred to repeatedly. This may respectively be the method for generating a spectrally encoded image from an original image and/or the method for decoding a spectrally encoded image for the purpose of generating a copy image of an original image. Beyond this, components and/or method steps used in the method will be introduced and/or described in detail. Mutually corresponding components and/or method steps of the two methods may here respectively differ, and may in particular be designed merely for an analogous functionality. These components and/or method steps here respectively have the described identical characteristics but may have further characteristics which are different and/or partially identical. "Designed" is in particular to mean specifically programmed, configured and/or equipped. An object being "designed for a certain function" is in particular to mean that the object fulfills and/or implements said certain function in at least one application state and/or operation state. A method being designed for a purpose is in particular to mean that the method comprises at least one method step that is specifically directed to the purpose, and/or that the method is specifically directed to the purpose, and/or that the method serves to fulfill a purpose and is at least partially optimized for such fulfillment.

The original image is advantageously a spatially two-dimensional image, in particular a spatially two-dimensional color image. It is however also conceivable that the original image is a spatially three-dimensional image, in particular a spatially three-dimensional color image. In particular, the original image may be a moving image, e.g. a video film, in particular a two-dimensional and/or colored video film.

A "spectrally encoded image" is in particular to be understood as an image which has at least one image parameter, which is dependent on at least one spectral coordinate of the image and whose spectral dependency encodes and/or represents and/or transports a piece of information that differs from a spectral dependency, in particular at least the first original image parameter of the original image. The spectrally encoded image preferably has at least one spectral light intensity distribution, which in particular varies pointwise spatially, and which encodes and/or represents and/or transports at least one piece of information, in particular original image information, preferentially the first original image parameter, which differs from a spectral light intensity distribution. In particular, the piece of information, preferentially the first original image parameter, is at least one spatial coordinate and/or a light intensity distribution that is a function of a spatial coordinate. For example, a certain wavelength corresponds to a certain point on a spatial axis. The spectrally encoded image advantageously has at least one, preferably precisely one, spatial dimension less than the original image. Preferably the spectrally encoded image is generated on a screen, for example by projection onto the screen and/or by a direct generation by means of suitable light sources, which are in particular arranged on the screen. Here the light sources are preferentially at least approximately punctiform light sources, which are in particular arranged directly adjacent to one another and/or above one another. Especially preferentially the light sources here have a spectrum which is adjustable according to requirements, which is in particular capable of being adjusted and/or adapted in a temporally modifiable manner by means of at least one digital control. The screen is in particular designed to represent the spectrally encoded image over a viewing angle of at least 90°, advantageously at least 180°, especially advantageously at least 270°, preferably at least 330° and particularly preferably precisely 360°. Advantageously the screen is made of a translucent material and/or of an opaque material and/or of a transparent material. It is conceivable to couple the spectrally encoded image into the screen, for example sidewise and/or from below, where advantageously the spectrally encoded image is coupled out in at least one direction that is different from the coupling-in direction, preferably at least substantially perpendicular to the coupling-in direction. "Designed" is in particular to mean specifically programmed, configured and/ or equipped. An object being designed for a certain function is in particular to mean that the object fulfills and/or executes said certain function in at least one application state and/or operation state. A method being designed for a purpose is in particular to mean that the method comprises at least one method step that is specifically directed to the purpose, and/or that the method is specifically directed to the purpose, and/or that the method serves to fulfill a purpose and is at least partially optimized for such fulfillment. "At least substantially perpendicular" is here in particular to mean an orientation of a direction relative to a reference direction, in particular in a reference plane, where the direction and the reference direction include an angle that differs from a right angle in particular by less than 8°, advantageously by less than 5° and especially advantageously by less than 2°.

The copy image is advantageously a spatially two-dimensional image, in particular a spatially two-dimensional color image. It is however also conceivable that the copy image is a spatially three-dimensional image, in particular a spatially three-dimensional color image. In particular, the copy image may be a moving image, for example a video film, in particular a two-dimensional and/or colored video film. Advantageously the copy image is at least similar to the original image. In particular, the original image and the copy image have an identical dimensionality. The copy image may, however, have a different size and/or a different aspect ratio and/or other inner proportions than the original image.

A first parameter being "encoded" into a second parameter is in particular to mean that an information content of the first parameter is at least partially transferred and/or translated into the second parameter. In a decoding it is in particular possible to at least partially deduce the information content of the first parameter from the second parameter.

A first parameter being "decoded" from a second parameter is in particular to mean that an information content of the second parameter is at least partially obtained from the first parameter. During encoding it is in particular possible to at least partially create the second parameter from the first parameter.

In an advantageous implementation of the invention it is proposed that the first transformation step and/or the second transformation step are/is carried out with at least one dispersive element. In particular, in the method for generating a spectrally encoded image, preferably in at least one of the encoding steps, a spatial coordinate of the original image is translated into a spectral coordinate of the image via dispersion. In particular in the method for decoding a spectrally encoded image, preferably in at least one of the decoding steps, a spectral coordinate of the image is translated into a spatial coordinate of the copy image via dispersion. In particular, in the method for generating a spectrally encoded image, the dispersive element is arranged between a projection unit, e.g. a projector, and the screen, and advantageously the original image is projected through the dispersive element, as a result of which preferably the spectrally encoded image is created, in particular on the screen. In particular, in the method for decoding a spectrally encoded image, the dispersive element is arranged between the spectrally encoded image, in particular the screen, and a viewer, in particular at least one eye of the viewer, wherein advantageously the spectrally encoded image is viewable through the dispersive element, as a result of which in particular the copy image is created behind the dispersive element, in particular on a retina of the eye. The viewer may as well have a technical eye such as a sensor or a camera, and may in particular be different from a human being. It is conceivable to generate a spectrally encoded image on a screen by projection through a slit, the slit comprising at least one dispersive element through which the image is projected and thus, by decoding, becomes viewable on a screen, which is in particular two-dimensional, as a realistic copy image of the original image. It is here conceivable that a viewing may also be effected through the dispersive element. This allows realizing a quick and reliable encoding and/or decoding.

In an especially advantageous implementation of the invention it is proposed that the dispersive element comprises at least one optical grating and/or at least one prism. Preferably a diffraction order≠0 of the dispersive element is used to generate the spectrally encoded image and/or copy image. It is here in particular conceivable that higher diffraction orders, in particular diffraction orders≠1, are used, in particular exclusively or in addition to a first diffraction order. In particular, for the method for generating a spectrally encoded image, at least one different dispersive element is used than for the method for decoding a spectrally encoded image, where in particular for both methods dispersive elements having identical or at least substantially identical optical characteristics are used. Principally it is however also conceivable to use, for the method for generating a spectrally encoded image, at least one dispersive element that is also used for the method for decoding a spectrally encoded image. Advantageously in this case a projection as well as a viewing are realized through the dispersive element. This advantageously allows a precise adaption of optical characteristics of components used. Furthermore, high complexity is advantageously avoidable in this way.

In particular for the purpose of achieving a high-level lighting efficiency and/or a sizable dispersion it is conceivable that at least one dispersive element is embodied at least partially of zinc oxide. In particular, it is conceivable that at least one dispersive element is embodied as a zinc oxide prism. Preferably the zinc oxide used is here present in its crystal state, particularly preferably as a monocrystal.

Principally it is also conceivable that at least one dispersive element is implemented as a water prism, for example embodied as a transparent housing, in particular made of glass, that is filled with water. Likewise a crown glass prism, in particular a BK7 crown glass prism, a flint glass prism, in particular an F2 flint glass prism, a heavy-flint glass prism, in particular an SF10 heavy-flint glass prism, and/or a quartz prism are/is conceivable. A dispersive element may principally also comprise at least one direct-vision prism, or may be implemented as such a prism. It is also conceivable to use at least one prism film as a dispersive element. It is further conceivable that at least one dispersive element is embodied as a holographic transmission grating, while differently produced gratings are of course conceivable as well. If at least one dispersive element is implemented as an optical grating, in particular a reflective grating, it is advantageously conceivable that a blaze of this optical grating is selected to be optimized to a diffraction efficiency of approximately 60% or approximately 80% and advantageously approximately 70%. A dispersive element may of course comprise any combination of different individual dispersive sub-elements, for example a combination of at least one prism with at least one optical grating, for example like a grism.

In a further implementation of the invention it is proposed that the first transformation step and the second transformation step are carried out with different dispersive elements, in particular with a first dispersive element and a second dispersive element that differs from the first dispersive element. The dispersive elements may, for example, have different spatial orientations relative to the original image and/or to the spectrally encoded image and/or to the copy image. They may, for example, also be made of different materials and/or have different geometries. Advantageously the dispersive elements respectively have at least one optical grating, where grating constants of the gratings preferably differ from one another. Especially advantageously the different dispersive elements have dispersion directions which are arranged parallel to one another. It is in particular possible to use different diffraction orders, in particular of the optical gratings having different grating constants, for the first transformation step and the second transformation step. It is as well conceivable to use the same diffraction order in each case. It is further conceivable that the dispersive elements each comprise at least one optical grating and at least one prism, wherein the dispersive elements are in particular respectively embodied by the prism and the optical grating, which is preferably arranged directly before the prism. It is also conceivable that different dispersive elements are arranged on at least one shared prism. Different optical gratings may, for example, be arranged on a shared prism and/or on a shared prism arrangement. Preferably different transformations of spatial coordinates and spectral coordinates are rendered possible due to different dispersive characteristics of the dispersive elements. In particular, the spectrally encoded image is generated as a superposition of different basic images resulting from a projection of the original image through the different dispersive elements. This advantageously allows generating and/or decoding a spectrally encoded image with a plurality of image components, each of them in particular containing respectively different information.

In a preferred embodiment of the invention it is proposed that the dispersive elements are arranged at least partially, preferably completely, immediately one behind the other one, in particular at a distance of less than 10 mm, advantageously less than 5 mm and particularly advantageously less than 2 mm. The dispersive elements may here be arranged in such a way that they are at least approximately congruent or may be offset sidewise. Preferentially a certain dispersive element respectively diffracts light of a $0^{th}$ diffraction order of a dispersive element that is preferably arranged immediately in front of it. This advantageously allows providing a high-quality imaging and/or a low degree of blurring.

Alternatively or additionally it is conceivable that the dispersive elements are arranged at least partially and preferably completely side by side, in particular immediately side by side, advantageously with a distance between the dispersive elements of maximally 2 mm, especially advantageously maximally 1 mm, preferably no more than 0.5 mm and particularly preferably maximally 0.1 mm, or even less. In particular, the dispersive elements here have, in particular perpendicularly to a direction of a light transmission, an extension of no more than 10 mm, advantageously maximally 5 mm, especially advantageously no more than 2 mm and preferably no more than 1 mm or possibly no more than 0.5 mm, where extensions of different dispersive elements may differ. In this case the first transformation step and/or the second transformation step are/is advantageously carried out with a plurality of first dispersive elements and/or with a plurality of second dispersive elements. Preferentially the dispersive elements have an extension and/or a distance from one another which do not/does not allow a human eye to distinguish the dispersive elements in an arrangement of the dispersive elements before said eye, in particular at a distance of less than 5 cm, advantageously at a distance of less than 3 cm, for example in case of an arrangement of the dispersive elements on a pair of spectacles. This advantageously allows achieving structural simplicity and/or reduced production costs.

In particular in case of a side-by-side arrangement of dispersive elements, it is conceivable that these are embodied as strip-shaped colored prism films. These may in particular be colored, for example corresponding to basic colors used. These strips are preferably arranged alternatingly side by side, advantageously forming a corresponding strip-pattern.

Principally it is also conceivable that the dispersive elements are embodied at least partly in a one-part implementation. It is in particular conceivable that a manifold line grating is used that implements the dispersive elements. For example, a manifold line grating, in particular a three-fold line grating, may be used implementing several, in particular three, different gratings, which are arranged in a mutually rotated fashion or are arranged in parallel with respect to one another. The different gratings advantageously have different grating constants. It is also conceivable that at least some of the gratings have identical grating constants. Of course a larger number of different gratings are here also conceivable. Moreover it is also conceivable that different, in particular strip-shaped multifold line gratings are arranged in a side-by-side arrangement and/or one behind the other one. Here it is in particular possible to avoid an occurrence of undesired secondary images in undesired positions by selecting suitable rotational angles.

In an advantageous implementation of the invention it is proposed that a first image parameter and/or a second image parameter are/is a light intensity distribution. Preferentially the first original image parameter and/or the second image parameter are/is a light intensity distribution, which is in particular a function of the spatial coordinate of the original image. Furthermore, the first copy image parameter and/or the second copy image parameter preferably are/is a light intensity distribution, which is in particular a function of the spatial coordinate of the copy image. Advantageously the first copy image parameter and/or the second image parameter is an image line of at least one first component image of the original image and/or of at least one second component image of the original image. Especially advantageously the first copy image parameter and/or the second copy image parameter are/is an image line of at least one first elementary image of the copy image and/or of at least one second elementary image of the copy image. The image parameters preferentially correspond to the respective original image parameters and/or the respective copy image parameters in that a certain wavelength corresponds to a certain coordinate. For example, the first original image parameter and the first image parameter are at least substantially an identical intensity distribution, which is however, in the case of the original image parameter, a function of the spatial coordinate of the original image and, in the case of the image parameter, of the spectral coordinate of the image, in particular a wavelength. This analogously applies for the copy image of the original image as well as for other original image parameters, image parameters and/or copy image parameters. Thus a certain coordinate, e.g. a certain x-value, corresponds to a certain wavelength. Location dependencies of certain image lines of certain component images of the original image and/or of certain elementary images of the copy image of the original image thus correspond to a certain image parameter. Preferably the first image parameter and/or the second image parameter are/is spatially at least substantially punctiform, in particular embodied as a light point having a certain light intensity distribution that depends on the spectral coordinate of the spectrally encoded image. In particular, the copy image corresponds to the original image at least to a large extent, in particular regarding spatial coordinates of the copy image, respectively the original image. This advantageously allows efficiently encoding and/or compressing image information. In this way it is furthermore possible to facilitate reliable and quick encoding and/or decoding by means of optical components.

In an especially advantageous implementation of the invention it is proposed that the first transformation step is carried out in a different spectral band, in particular regarding a spectral coordinate, than the second transformation step. Here the spectral bands are preferably disjoint. It is however also conceivable that the spectral bands at least partially overlap. In particular, the spectral bands have a width of at least 10 nm, advantageously no less than 50 nm and particularly advantageously at least 100 nm. The spectral bands may however also have a greater width, e.g. a width of 150 nm or 200 nm or 300 nm. In particular, the spectral bands have a width of maximally 300 nm, advantageously no more than 200 nm and especially advantageously no more than 100 nm. Advantageously an overlap region of the spectral bands has a width of maximally 50 nm, particularly advantageously of no more than 10 nm, preferentially of maximally 5 nm and particularly preferably of no more than 1 nm. Advantageously the original image and/or the encoded image and/or the copy image of the original image here comprise component images and/or basic images and/or elementary images of the respective spectral bands. This advantageously allows encoding and/or decoding different pieces of information of an image in an analogous manner.

In a preferred implementation of the invention it is proposed that the method comprises at least one third transformation step, which is carried out in a different spectral band, in particular regarding a spectral coordinate, than the first and second transformation steps. In particular, the third transformation step is carried out analogously to the first and second transformation steps, where advantageously a third original image parameter is analogously encoded into a third image parameter, and/or a third copy image parameter is decoded from the third image parameter. Moreover further transformation steps are conceivable in an analogous fashion. This advantageously allows efficient transportation of large information contents.

In a particularly preferred implementation of the invention it is proposed that the different spectral bands each correspond to a respective basic color. The method is advantageously carried out in exactly three different spectral bands, each of which corresponds to a basic color, for example following an RGB color mixing. It is however also conceivable that the method is carried out in more than three, for example in four or five or even more different spectral bands, each of which corresponds to a respective basic color, for example following an RGBY color mixing. In particular, the first spectral band corresponds to a blue basic color, e.g. a range between approximately 400 nm and approximately 500 nm, and/or the second spectral band corresponds to a green basic color, e.g. a range between approximately 500 nm and approximately 600 nm, and/or the third spectral band corresponds to a red basic color, e.g. a range between approximately 600 nm and approximately 700 nm. This advantageously allows providing an at least approximately true-color spectral encoding and/or decoding.

It is further proposed that the spectrally encoded image comprises a plurality of basic images, in particular three basic images, with different basic colors, in particular three different basic colors, which together encode the original image at least approximately in a true-color fashion. In particular, the original image comprises at least one first component image, in particular with a first basic color, preferably blue, which is encoded into a first basic image, in particular a first basic image with the first basic color. In particular, the original image comprises at least one second component image, in particular with a second basic color, preferably green, which is encoded into a second basic image, in particular a second basic image with the second basic color. In particular, the original image comprises at least one third component image, in particular with a third basic color, preferably red, which is encoded into a third basic image, in particular a third basic image with the third basic color. Analogously the copy image of the original image advantageously comprises elementary images of respective basic colors, which are decoded from basic images of the spectrally encoded image. The basic colors of the elementary images may here be different from the basic colors of the component images of the original image. A spectrum of a certain original image point of the original image is here in particular different from a spectrum of a copy image point of the copy image of the original image, which corresponds to the original image point. In particular, the spectrum of the original image point is a continuous spectrum. Furthermore, in particular the spectrum of the copy image point is at least approximately a discrete spectrum and/or a discontinuous spectrum, advantageously with at least one intensity peak respectively in a blue, a green and a red spectral band, preferentially in the first spectral band, the second spectral band and the third spectral band. In this way spectrally encoding and/or decoding an image with several basic colors is advantageously possible.

Furthermore it is proposed that the spectrally encoded image is spatially at least substantially one-dimensional. Preferentially the spectrally encoded image is strip-shaped. In particular, the spectrally encoded image has a y-coordinate that corresponds to a y-coordinate or to a central dilation of a y-coordinate of the original image and/or of the copy image of the original image. This advantageously allows generating an image that is viewable over a large angle range. Moreover, advantageous characteristics regarding space efficiency are achievable in this way.

Beyond this the invention is based on an encoding device for the purpose of generating a spectrally encoded image from an original image, in particular by the method for generating a spectrally encoded image, with at least one encoding unit, which is designed for an encoding of at least one first original image parameter, which is in particular dependent on at least one spatial coordinate of the original image, into at least one first image parameter which is dependent on at least one spectral coordinate of the spectrally encoded image.

It is proposed that the encoding unit is designed for an encoding of a second original image parameter, which is in particular dependent on the spatial coordinate of the original image, into at least one second image parameter which is dependent on the spectral coordinate of the spectrally encoded image.

By an encoding device according to the invention, advantageous characteristics regarding image generation, in particular a generation of a spectrally encoded image, are achievable. Further it is advantageously possible to efficiently encode image information. Moreover a true-coloring of an image may be preserved at least partly, in particular at least approximately completely. It is advantageously possible to generate an image, in particular a true-color image, which is viewable from different angles, in particular from all around. Furthermore an independency from a projector is advantageously facilitated. Moreover mirror-immunity is achieved.

Beyond this, the invention is based on a decoding device for the purpose of generating a copy image of an original image from a spectrally encoded image, in particular by the method for decoding a spectrally encoded image, with at least one decoding unit designed for a decoding of at least one first copy image parameter, which is in particular dependent on at least one spatial coordinate of the copy image, from at least one first image parameter which is dependent on at least one spectral coordinate of the spectrally encoded image.

It is proposed that the decoding unit is designed for a decoding of at least one second copy image parameter from at least one second image parameter, which is dependent on the spectral coordinate of the spectrally encoded image.

By a decoding device according to the invention, advantageous characteristics regarding an image generation, in particular generation of a spectrally decoded image, are achievable. It is moreover advantageously possible to efficiently decode image information. Furthermore a true-coloring of an image may advantageously be preserved at least partially, in particular at least approximately completely. It is advantageously possible to decode and/or view an image, in particular a true-color image, which is viewable from different angles, in particular from all around. Further advantageously an independency from a projector is made possible. Beyond this a mirror-immunity is achieved. It is also advantageously possible to generate a seemingly floating and/or partly transparent virtual image.

Advantageous characteristics regarding image generation are in particular achievable by way of an image-generating system, in particular a display, a head-up display, or a projector system, with at least one device for generating a spectrally encoded image and with at least one device for generating a copy image of an original image.

It is also conceivable that at least one of the transformation steps, in particular a first and/or a second and/or a third and/or one of the encoding steps are/is performed in a different manner, in particular without using dispersive elements. For generation of a spectrally encoded image, besides projection through different dispersive elements onto an opaque, respectively translucent screen, further methods are possible. For example, in a manner similar to the Lippmann method (also known as interference photography), a narrow strip or a narrow cylinder may be produced, with a nanostructure which, in case of diffuse white-light illumination, reflects desired spectral colors due to interference. It is also possible to generate individual light points of the spectrally encoded image by means of a spectrally tunable laser and/or by means of a supercontinuum laser filtered according to color. Spectrally tunable LEDs and/or spectrally tunable LCD pixels or the like are also conceivable. These may in particular be arranged on an image-generating screen, generating the spectrally encoded image directly. Preferentially corresponding encoding steps are in this case carried out in a computer-based fashion. In particular the original image is digitized and encoded. Then the image-generating screen is controlled accordingly, to show the spectrally encoded image. Beyond this it is possible to bring generated light to required points of the spectrally encoded image via optical fibers. Such methods and devices make a generation of the spectrally encoded image independent from a projector, which means a projector may be dispensed with and/or may be placed in any desired location.

It is also conceivable to use for the encoding an arrangement that is analogous to an Offner spectrometer wherein, instead of the conventionally used sensor array, for a generation of component images of the original image, a projection unit, in particular a Spatial Light Modulator, is arranged in a suitable place. In this way in particular a high light yield is achievable. Analogously it is conceivable to use a construction similar to an Offner spectrometer for the decoding.

Moreover it is conceivable that the original image, respectively the component images and/or elementary images of the original image, are, in particular digitally, pre-distorted and/or, in particular spatially, modulated regarding their brightness. In particular, an adaptation is conceivable that is designed for a compensation of deviations between the original image and the copy image of the original image, which are due to the optical elements used, to the dispersive elements used and/or to a configuration of the screen. It is also possible to compensate an irregular spectral profile of a light source. Furthermore an optimization of a color superposition of component images and/or original images may be carried out. Preferentially the encoding device comprises a computing unit, which is designed to carry out a suitable routine for pre-distortion and/or brightness modulation of the original image, respectively of its component images and/or elementary images. For pre-distortion and/or brightness modulation, the original image is preferably split up into a certain number of image strips, e.g. in a transverse direction of the original image. Here a number of image strips may, for example, correspond to a number of pixels in the respective direction, the pixels being advantageously pixels of the original image in its representation, respectively projection, by the projection unit. After that, the image strips are advantageously distorted and/or brightness-modulated and/or adapted accordingly. It is here principally conceivable that the computing unit is designed for a determination of modulation parameters as a function of configuration parameters and/or geometrical parameters of the dispersive elements, of the screen, of the projection unit, of a projector, e.g. a data projector, and/or of environment parameters and the like, such that the original image is adapted according to these parameters. Preferably a distortion function used has an average value of 1, as a result of which the aspect ratio of the original image is preserved. This in particular allows generating a true-color copy image of the original image, where deviations between colors of the copy image of the original image and the original image are mostly avoided.

In particular in case of an active screen designed for direct generation of the encoded image, it is also conceivable that the encoded image is modulated by a computing unit in such a way that imaging errors and/or undesired non-linear effects etc. of the decoding device, in particular of its dispersive elements, are compensated. In particular in case of an active screen, the original image may be modulated and/or adapted accordingly to fulfill the same purpose.

To minimize the distance between the spectrally encoded image, respectively the screen, and dispersive elements used, it is possible to integrate the dispersive elements in an optical waveguide.

The described methods and devices may also be used for an image acquisition and/or image transmission, and/or may be applied analogously. Image acquisition and image transmission are thus also subject matters of the invention. For example, depending on an application, a spectrally encoded image that is spatially at least substantially point-shaped may be sufficient, said spectrally encoded image being transmittable from a start point to an end point in particular via an optical fiber, for example for applications in the field of endoscopy.

In particular in the context of spectrally encoded displays, a plurality of spectrally encoded light lines may be arranged adjacently to one another and may advantageously be separated by visual barriers. This allows different object images to come into sight, depending on a viewer's position. It is for example possible to create a variety of perspective views by changing a viewing direction.

Different methods and devices may be used for encoding and decoding. If a device is used that is based on three parallel dispersive elements for encoding and decoding, respectively, there is a substantial advantage in that, to create a similarity between the RGB image and the original image, it is not necessary to split the projected original image, e.g. on a software basis, into its RGB components prior to a dispersion nor need it be subjected to pre-distorting or to another type of image processing. This is advantageous not only for image generation but also for image acquisition and/or imaging and image transmission. There is another advantage of the invention, namely an optional independency from a projector and optional multi-perspectivity.

Principally, in particular to avoid disturbances due to stray light and/or ambient light, it is conceivable that at least one light baffle is arranged in particular in a region of a light path from the projection unit to the screen. It is in particular possible to use wedge-shaped light baffles converging in particular towards the screen. Alternatively or additionally it is conceivable to use a combination of several slit apertures, which are preferentially arranged one behind the other one, where particularly preferably the slit apertures are the narrower the closer they are to the screen.

Beyond this it is conceivable that the projection unit comprises at least one imaging optics unit that reduces a size of the original image projected through the dispersive element that is arranged between the projection unit and the spectrally encoded image, in particular for the purpose of optimizing the light yield. Alternatively or additionally, such an imaging optics unit may also be arranged between the projection unit and the screen. The imaging optics unit may here have suitable, in particular curved, mirrors and/or lenses. In particular, the imaging optics unit is embodied in such a way that in the location of the screen a width of the original image, in particular a width that is perpendicular to a longitudinal direction of the screen, corresponds to a width of a spectrum of a white line in the location of the screen, which is in particular oriented parallel to the longitudinal direction of the screen. It is here in particular assumed that the white line and the original image have been generated by the same light source and/or cover the same spectral band. Advantageously, individual, in particular monochromatic, images of the original image are here projected into a screen plane, which is in particular arranged perpendicularly to a projection direction, in such a way that an edge of a shortest-wave individual image facing towards the screen coincides with an edge of a longest-wave individual image facing towards the screen. Monochromatic individual images of in-between-situated spectral colors then advantageously appear between the shortest-wave individual image and the longest-wave individual image. If the original image is, in the location of the screen, narrower than the spectrum, a certain region of shortest-wave and/or longest-wave individual images is not shown on the screen, as a result of which only a partial range of the spectrum is usable for the spectral encoding. Vice versa, if the original image is wider than the spectrum, certain image regions, in particular peripheral regions, are not shown on the screen, and the spectrally encoded image therefore in particular corresponds only to a section of the original image. Analogous considerations respectively apply for individual spectral regions of individual basic colors used, that is for example for a spectral band of red light, for a spectral band of green light and for a spectral band of blue light (other color mixtures being of course also conceivable without restrictions) and for corresponding component images of the original image.

The methods and devices according to the invention are here not to be restricted to the application and implementation described above. To achieve a functionality that is described here, the methods and devices according to the invention may comprise a number of respective elements, structural components, units and method steps that differs from a number given here. Moreover, regarding the value ranges given in this disclosure, values within the limits named are also to be considered as disclosed and as applicable according to requirements.

DRAWINGS

Further advantages will become apparent from the following description of the drawings. In the drawings two exemplary embodiments of the invention are illustrated. The drawings, the description and the claims contain a plurality of features in combination. Someone skilled in the art will purposefully also consider the features separately and will find further expedient combinations.

Figure 2:
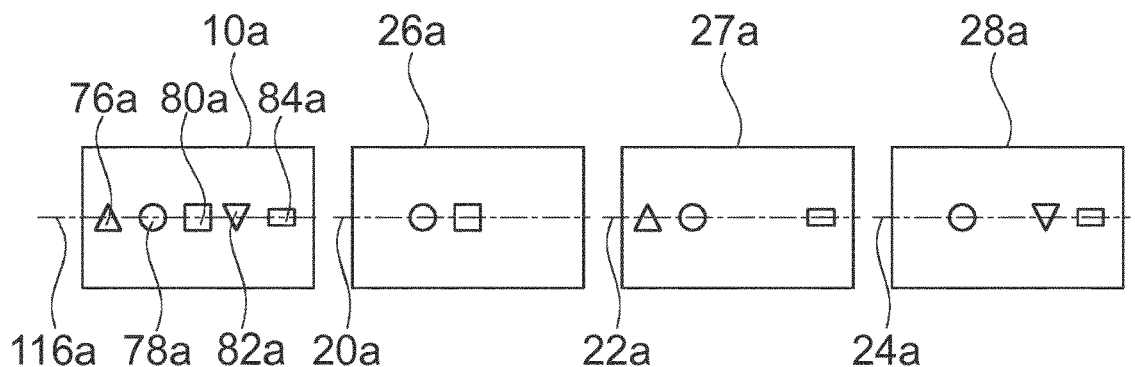
Figure 3:
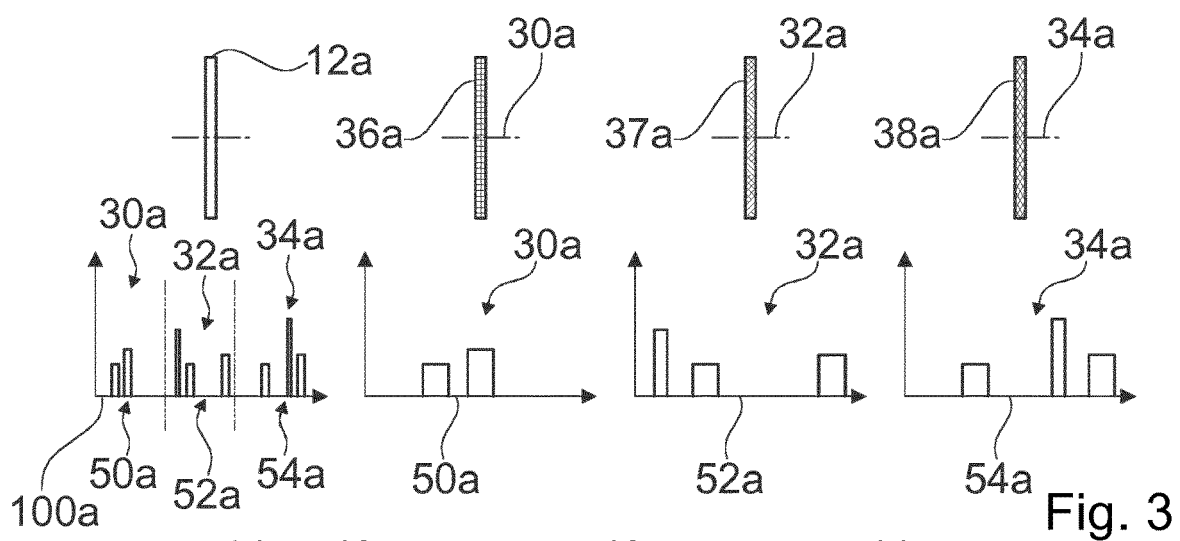
Figure 4:
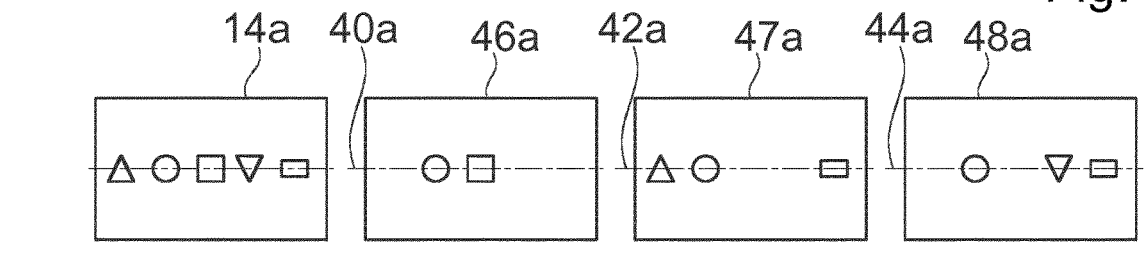
Figures 10A, 10B:
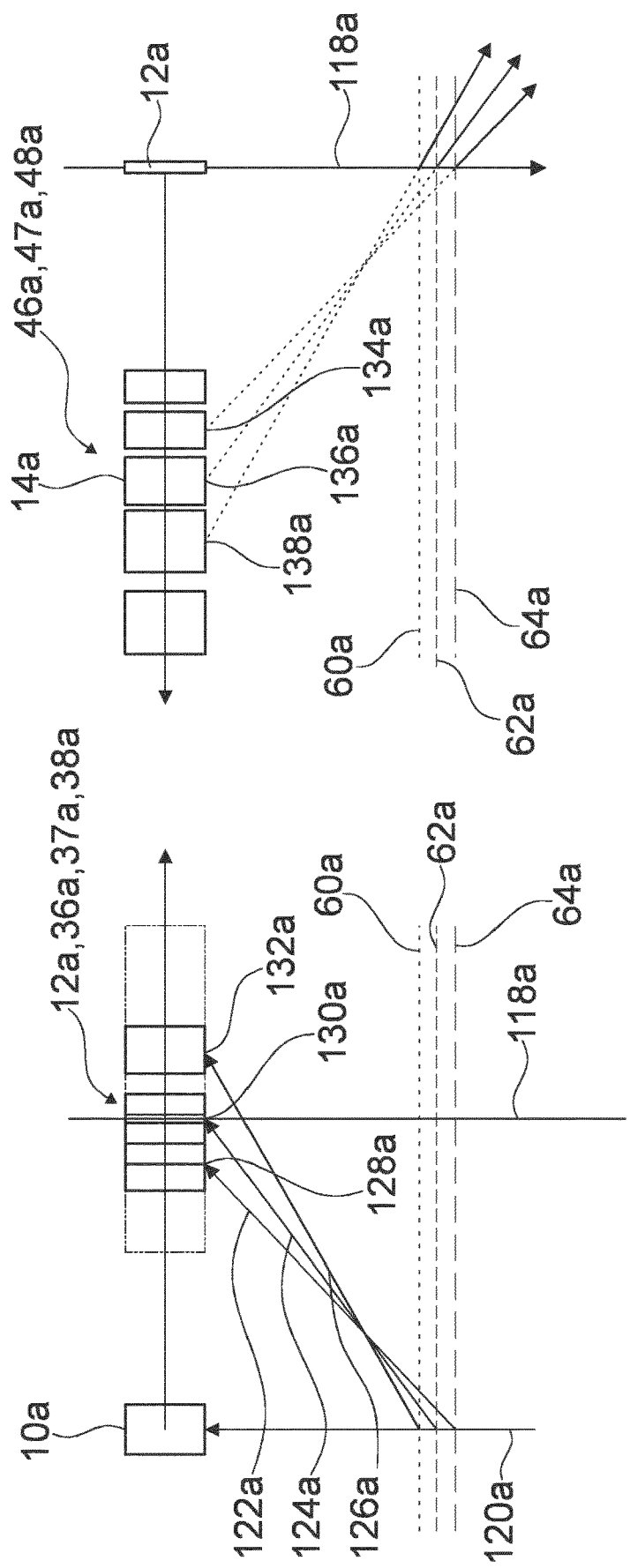
Figure 11:
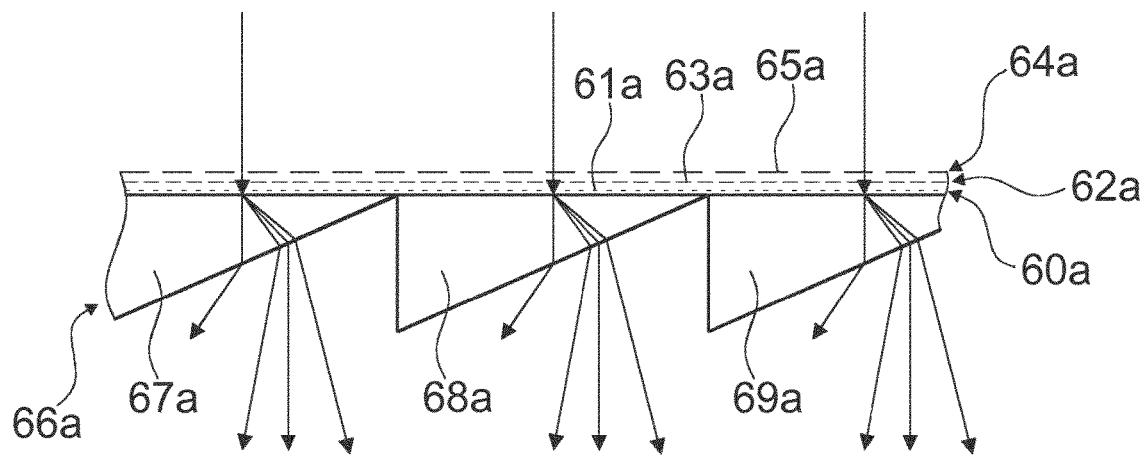
Figure 12A:
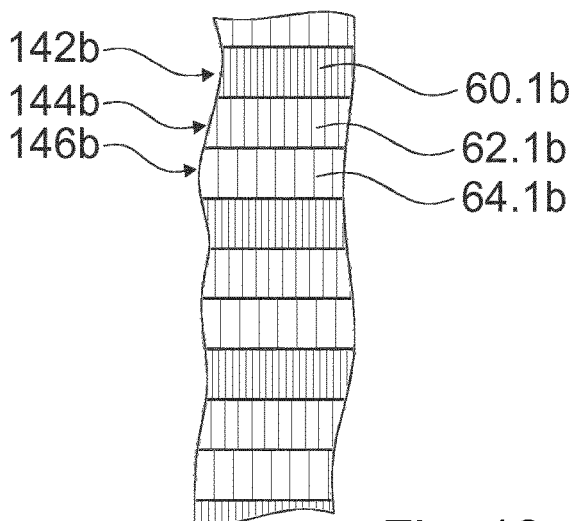
Figure 12B:
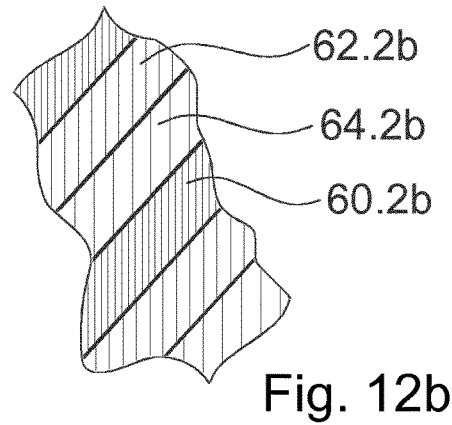
Figure 12C:
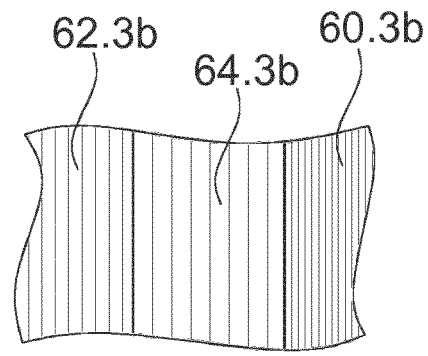
Figure 13:
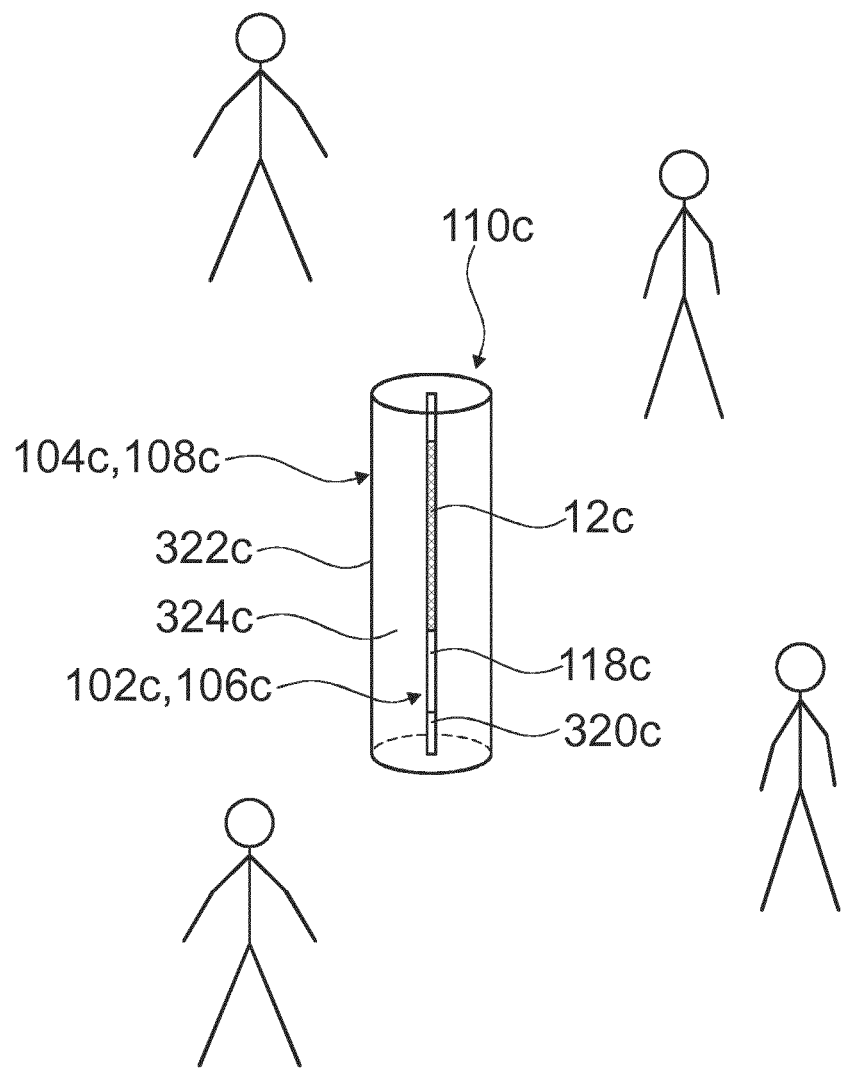
Figure 14:
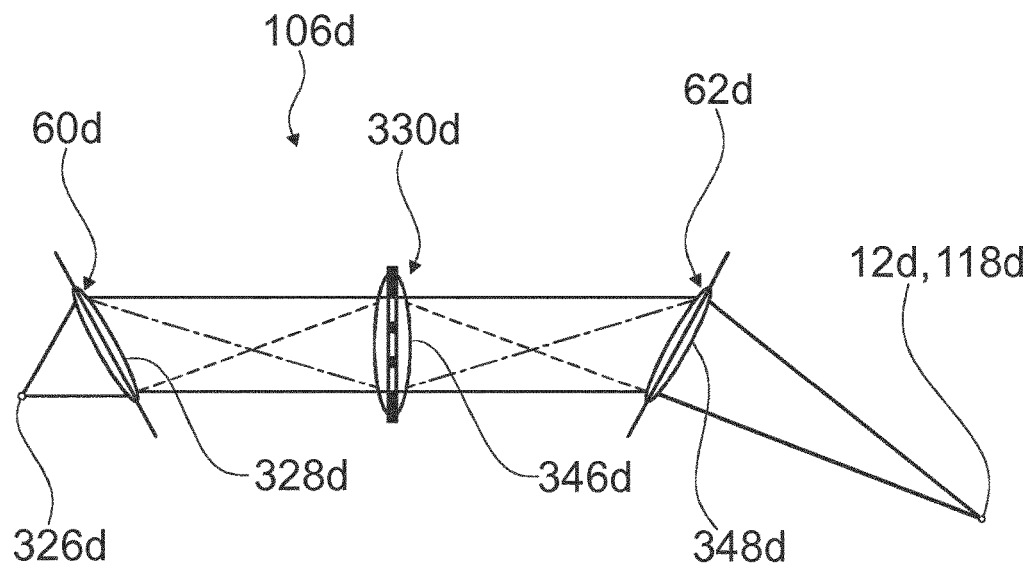
Figure 15:
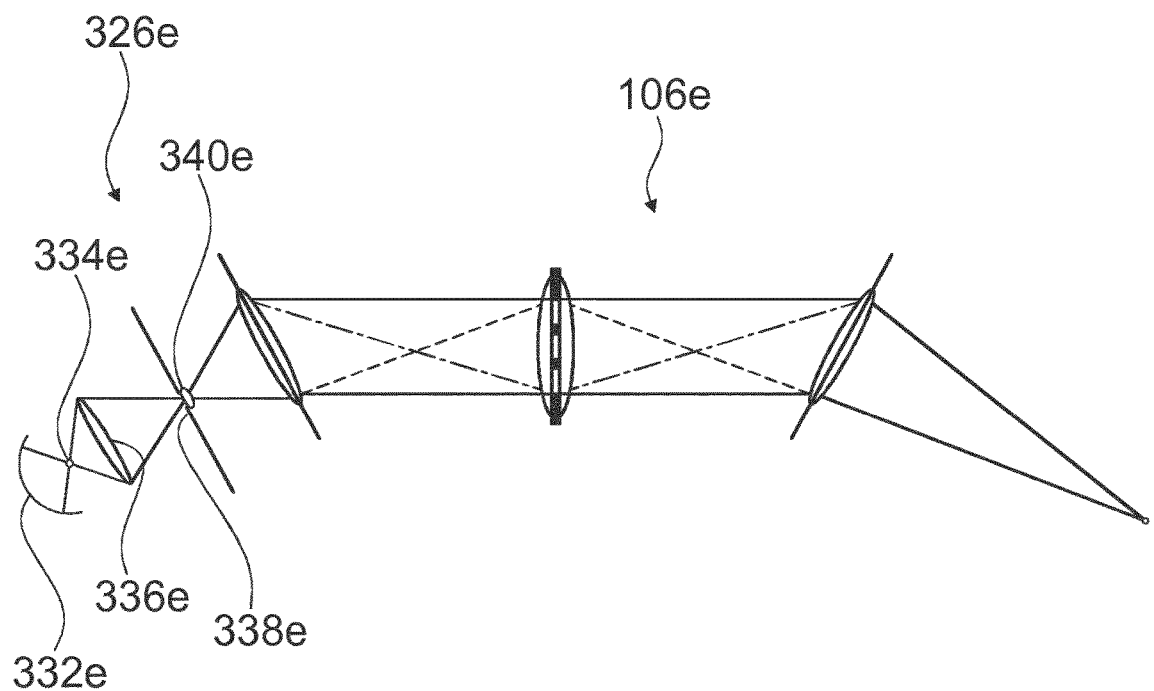
Figure 16:
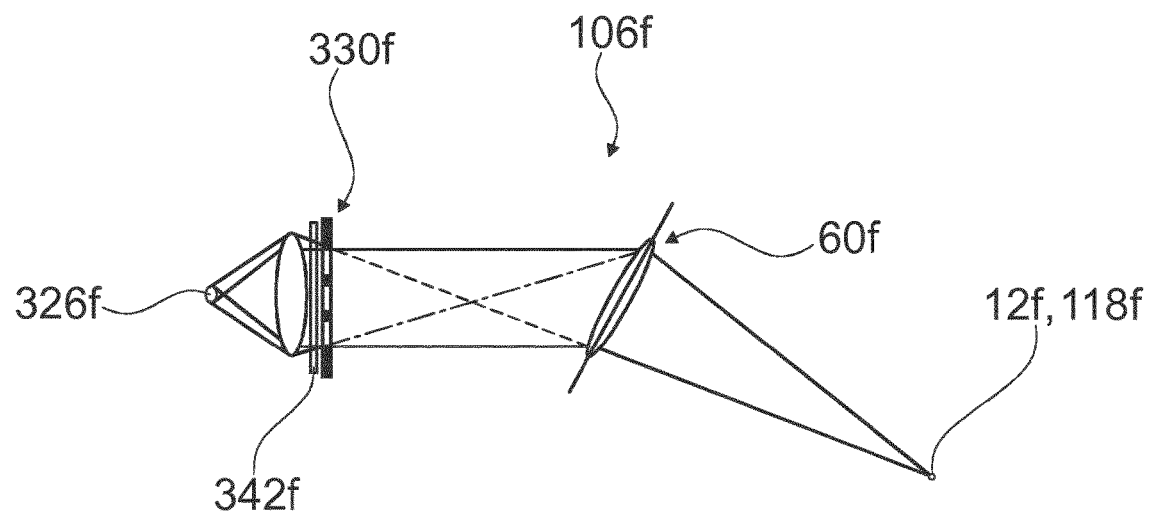
Figure 17:
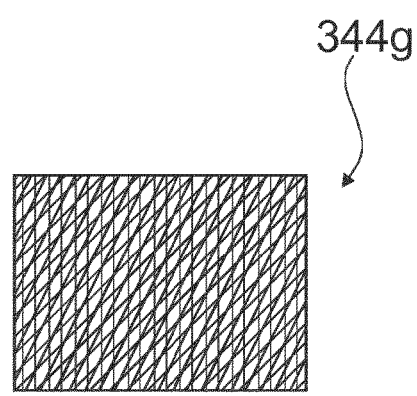

It is shown in:

FIG. 1 an image-generating system with an encoding device and a decoding device, in a schematic representation, FIG. 2 an original image and component images of the original image, in a schematic representation, FIG. 3 a spectrally encoded image and basic images of the spectrally encoded image, in a schematic representation, FIG. 4 a copy image of the original image and elementary images of the copy image, in a schematic representation, FIG. 5 a dispersion diagram for a generation of a first exemplary spectrally encoded image based on a first exemplary original image, FIG. 6 a dispersion diagram for a generation of a second exemplary spectrally encoded image based on a second exemplary original image, FIG. 7 a dispersion diagram for a generation of a third exemplary spectrally encoded image out of a third exemplary original image by means of three dispersive elements, FIG. 8 an image-based construction method for generating an exemplary fourth spectrally encoded image and its decoding, FIG. 9 a schematic representation of a generation of the spectrally encoded image and its decoding via the encoding device and the decoding device, in analogy to FIG. 8, FIG. 10 a front view of three superimposed basic images of the spectrally encoded image and elementary images of a copy image of the original image, respectively together with a view of the corresponding light path, FIG. 11 an arrangement of the dispersive elements of the device in a schematic plan view, FIG. 12 alternative arrangements of dispersive elements, FIG. 13 a further image-generating system with an encoding device and a decoding device, in a schematic front view, FIG. 14 a first alternative encoding device in a schematic representation, FIG. 15 a second alternative encoding device in a schematic representation, FIG. 16 a third alternative encoding device in a schematic representation, and FIG. 17 an alternative dispersive element in a schematic representation.

DESCRIPTION OF THE EXEMPLARY EMBODIMENTS

FIG. 1 shows an image-generating system 110a with an encoding device 106a and a decoding device 108a in a schematic representation.

The encoding device 106a is designed for a generation of a spectrally encoded image 12a out of an original image 10a (cf. FIGS. 2 and 3). The encoding device 106a comprises at least one encoding unit 102a that is designed for an encoding of at least one first image parameter 20a, which is in particular dependent on at least one spatial coordinate 112a of the original image 10a, into at least one first image parameter 30a that is dependent on at least one spectral coordinate 100a of the spectrally encoded image 12a. The encoding unit 102a is designed for an encoding of a second original image parameter 22a, which is in particular dependent on the spatial coordinate 112a of the original image 10a, into at least one second image parameter 32a that is dependent on the spectral coordinate 100a of the spectrally encoded image 12a. The encoding unit 102a comprises a one-dimensional screen 118a, which the spectrally encoded image 12a is projected onto. The encoding unit 102a comprises dispersive elements 60a, 62a, 64a, which are shown in detail in FIGS. 10 and 11. In the present case the encoding unit 102a further comprises a projector 140a. By means of the projector 140a the original image 10a is projected through the dispersive elements 60a, 62a, 64a and the spectrally encoded image 12a is generated. If, instead of the one-dimensional screen 118a, for example a two-dimensional screen is used, it is conceivable that this screen is preferably shaded off via light baffles on at least one side, advantageously on the left-hand and on the right-hand side, as a result of which an at least substantially one-dimensional image is generated on the screen by projection. In this case light projected to the side of the one-dimensional image is, for example, absorbed and/or scattered.

In the present case a method for generating a spectrally encoded image 12a from an original image 10a is carried out, with at least one first transformation step, in particular a first encoding step, in which at least one first original image parameter 20a, which is in particular dependent on at least one spatial coordinate 112a, advantageously an x-coordinate, of the original image 10a, is encoded into at least one first image parameter 30a which is dependent on at least one spectral coordinate 100a of the spectrally encoded image 12a, where the method comprises at least one second transformation step, in particular a second encoding step, in which at least one second original image parameter 22a, which is in particular dependent on the spatial coordinate 112a of the original image 10a, is encoded into at least one second image parameter 32a which is dependent on the spectral coordinate 100a of the spectrally encoded image 12a.

The decoding device 108a is designed for a generation of a copy image 14a of an original image 10a from a spectrally encoded image 12a (cf. FIGS. 2, 3 and 4). The decoding device 108a comprises at least one decoding unit 104a, which is designed for a decoding of at least one first copy image parameter 40a, which is in particular dependent on a spatial coordinate 114a of the copy image 14a, from at least one first image parameter 30a which is dependent on at least one spectral coordinate 100a of the spectrally encoded image 12a. The decoding unit 104a is designed for a decoding of at least one second copy image parameter 42a from a second image parameter 32a which is dependent on the spectral coordinate 100a of the spectrally encoded image 12a. The decoding unit 104a is in the present case embodied as a pair of spectacles. The decoding unit 104a may also be realized as a firmly installed viewing window or the like. The decoding unit 104a comprises three dispersive elements 60a, 62a, 64a (cf. also FIGS. 10 and 11). For a decoding of the spectrally encoded image 12a, said spectrally encoded image 12a is viewed through the dispersive elements 60a, 62a, 64a.

In the present case a method for decoding a spectrally encoded image 12a for the purpose of generating a copy image 14a of an original image 10a is carried out, with at least one first transformation step, in particular a first decoding step, in which at least one first copy image parameter 40a, which is in particular dependent on at least one spatial coordinate 114a, advantageously an x-coordinate, of the copy image 14a, is decoded from at least one first image parameter 30a which is dependent on at least one spectral coordinate 100a of the spectrally encoded image 12a, where the method comprises at least one second transformation step, in particular a second decoding step, in which at least one second copy image parameter 42a, which is in particular dependent on the spatial coordinate 114a of the copy image 14a, is decoded from at least one second image parameter 32a which is dependent on the spectral coordinate 100a of the spectrally encoded image 12a.

FIG. 2 shows the original image 10a as well as component images 26a, 27a, 28a of the original image 10a in a schematic representation. FIG. 3 shows the spectrally encoded image 12a as well as basic images 36a, 37a, 38a of the spectrally encoded image 12a in a schematic representation. FIG. 4 shows the copy image 14a of the original image 10a as well as elementary images 46a, 47a, 48a of the copy image 14a in a schematic representation.

The original image 10a comprises in the present case (from left to right) a green triangle 76a, a white circle 78a, a blue square 80a, a red triangle 82a and a yellow rectangle 84a. To facilitate understanding, a simply structured original image 10a was chosen but any kind of original image is conceivable. The original image 10a comprises a first component image 26a, a second component image 27a and a third component image 28a. The first component image 26a is a blue component image of the original image 10a. The first component image 26a comprises a first spectral band 50a. The first spectral band 50a extends in the present case from approximately 400 nm to approximately 500 nm. The second component image 27a is a green component image of the original image 10a. The second component image 27a comprises a second spectral band 52a. The second spectral band 52a extends in the present case from approximately 500 nm to approximately 600 nm. The third component image 28a is a red component image of the original image 10a. The third component image 28a comprises a third spectral band 54a. The third spectral band 54a extends in the present case from approximately 600 nm to approximately 700 nm.

The first component image 26a comprises a first original image parameter 20a. The first original image parameter 20a is a light intensity distribution which is dependent on the spatial coordinate 112a of the original image 10a and in particular extends over the first spectral band 50a. The spatial coordinate 112a is in the present case an x-coordinate of the original image 10a. The first original image parameter 20a forms an image line of the first component image 26a. The first component image 26a comprises a plurality of different first original image parameters 20a, which generate the first component image 26a line by line.

The second component image 27a comprises a second original image parameter 22a. The second original image parameter 22a is a light intensity distribution which is dependent on the spatial coordinate 112a of the original image 10a and in particular extends over the second spectral band 52a. The spatial coordinate 112a is in the present case an x-coordinate of the original image 10a. The second original image parameter 22a forms an image line of the second component image 27a. The second component image 27a comprises a plurality of different second original image parameters 22a, which generate the second component image 27a line by line.

The third component image 28a comprises a third original image parameter 24a. The third original image parameter 24a is a light intensity distribution which is dependent on the spatial coordinate 112a of the original image 10a and in particular extends over the third spectral band 54a. The spatial coordinate 112a is in the present case an x-coordinate of the original image 10a. The third original image parameter 24a forms an image line of the third component image 28a. The third component image 28a comprises a plurality of different third original image parameters 24a, which generate the third component image 28a line by line.

A superposition of the first original image parameter 20a, the second original image parameter 22a and the third original image parameter 24a is a light intensity distribution 116a. The light intensity distribution 116a is dependent on the spatial coordinate 112a of the original image 10a. The light intensity distribution 116a forms an image line of the original image 10a. A superposition of the plurality of different first original image parameters 20a, the plurality of different second original image parameters 22a and the plurality of different third original image parameters 24a generates the original image 10a line by line.

In addition to a dependency on the spatial coordinate 112a of the original image 10a, the first original image parameter 20a and/or the second original image parameter 22a and/or the third original image parameter 24a may also feature a spectral dependency, in particular within the respective spectral band 50a, 52a, 54a.

The spectrally encoded image 12a comprises a first basic image 36a, a second basic image 37a and a third basic image 38a. The first basic image 36a is a blue component image of the spectrally encoded image 12a. The second basic image 37a is a green component image of the spectrally encoded image 12a. The third basic image 38a is a red component image of the spectrally encoded image 12a. The first basic image 36a comprises the first spectral band 50a. The second basic image 37a comprises the second spectral band 52a. The third basic image 38a comprises the third spectral band 54a.

The first basic image 36a comprises at least one first image parameter 30a. The first image parameter 30a is a light intensity distribution that is dependent on the spectral coordinate 100a of the spectrally encoded image 12a, in particular within the first spectral band 50a. The first image parameter 30a here spectrally encodes the first original image parameter 20a of the original image 10a. The spectrally encoded image 12a comprises a plurality of different first image parameters 30a generating the first basic image 36a point by point.

The second basic image 37a comprises a second image parameter 32a. The second image parameter 32a is a light intensity distribution that is dependent on the spectral coordinate 100a of the spectrally encoded image 12a, in particular within the second spectral band 52a. The second image parameter 32a here spectrally encodes the second original image parameter 22a of the original image 10a. The spectrally encoded image 12a comprises a plurality of different second image parameters 32a generating the second basic image 37a point by point.

The third basic image 38a comprises at least one third image parameter 34a. The third image parameter 34a is a light intensity distribution that is dependent on the spectral coordinate 100a of the spectrally encoded image 12a, in particular within the third spectral band 54a. The third image parameter 34a here spectrally encodes the third original image parameter 24a of the original image 10a. The spectrally encoded image 12a comprises a plurality of different third image parameters 34a generating the third basic image 38a point by point.

In the present case the spectral coordinate 100a of the spectrally encoded image 12a extends over the first spectral band 50a, the second spectral band 52a and the third spectral band 54a.

The copy image 14a of the original image 10a comprises a first elementary image 46a, a second elementary image 47a and a third elementary image 48a. The first elementary image 46a is a blue elementary image of the copy image 14a. The second elementary image 47a is a green elementary image of the copy image 14a. The third elementary image 48a is a red elementary image of the copy image 14a. The first elementary image 46a comprises the first spectral band 50a. The second elementary image 47a comprises the second spectral band 52a. The third elementary image 48a comprises the third spectral band 54a.

The first elementary image 46a comprises at least one first copy image parameter 40a. The first copy image parameter 40a is a light intensity distribution that is dependent on the spatial coordinate 114a of the copy image 14a and in particular extends over the first spectral band 50a. The spatial coordinate 114a is in the present case an x-coordinate of the copy image 14a. The first copy image parameter 40a forms an image line of the first elementary image 46a. The first copy image parameter 40a is a representation of the first original image parameter 20a. The first copy image parameter 40a is decoded from the first image parameter 30a. The first elementary image 46a comprises a plurality of different first copy image parameters 40a generating the first elementary image 46a line by line.

The second elementary image 47a comprises at least one second copy image parameter 42a. The second copy image parameter 42a is a light intensity distribution that is dependent on the spatial coordinate 114a of the copy image 14a and in particular extends over the second spectral band 52a. The spatial coordinate 114a is in the present case an x-coordinate of the copy image 14a. The second copy image parameter 42a forms an image line of the second elementary image 47a. The second copy image parameter 42a is a representation of the second original image parameter 22a. The second copy image parameter 42a is decoded from the second image parameter 32a. The second elementary image 47a comprises a plurality of different second copy image parameters 42a generating the second elementary image 47a line by line.

The third elementary image 48a comprises a third copy image parameter 44a. The third copy image parameter 44a is a light intensity distribution that is dependent on the spatial coordinate 114a of the copy image 14a and in particular extends over the third spectral band 54a. The spatial coordinate 114a is in the present case an x-coordinate of the copy image 14a. The third copy image parameter 44a forms an image line of the third elementary image 48a. The third copy image parameter 44a is a representation of the third original image parameter 24a. The third copy image parameter 44a is decoded from the third image parameter 34a. The third elementary image 48a comprises a plurality of different third copy image parameters 44a generating the third elementary image 48a line by line.

In the present case the situation in an encoding and in a decoding may be expressed by the following notation:

$$I_{oi}(x,y,\lambda) \rightarrow I_{image}(y',\lambda(x)) \rightarrow I_{ci}(x'',y'',\lambda)$$

where "oi" means the original image and "ci" means the copy image, x, x", y, y' and y" are spatial coordinates and λ is a wavelength. $I_{oi}$ is here an intensity distribution of an original image, $I_{image}$ is an intensity distribution of an image and $I_{ci}$ is an intensity distribution of a copy image of the original image.

FIG. 5 shows a dispersion diagram for a generation of a first exemplary spectrally encoded image 200a from a first exemplary grayscale original image, to illustrate a functionality of spectral encoding/decoding according to the prior art. FIG. 5a shows an encoding step in the dispersion diagram. White broadband light is equivalent to a composition of light of all visible wavelengths, respectively a superposition of different spectral colors. The grayscale original image is hence equivalent to a stack of congruent, equally brightness-modulated (monochromatic) individual images 204a, 206a, 208a of different spectral colors respectively light wavelengths. To give an enhanced overview, the individual images 204a, 206a, 208a are drawn in cross sections, as discrete bars. Of course, in reality the grayscale original image virtually comprises an infinite number of monochromatic individual images, each corresponding to a certain wavelength out of a continuous wavelength range that is represented by the wavelength axis 211a. Upon projection through a dispersive element (not shown), e.g. an optical prism or a diffractive grating, the stack of individual images is sheared as the individual images having different spectral colors and/or light wavelengths undergo a respectively different offset. As a result of this, different image strips 212a, 214a, 216a from different individual images 204a, 206a, 208a arrive at a location that is designed for a one-dimensional screen, which is represented by an encoding line 210a. Different image strips 212a, 214a, 216a etc. of the grayscale original image are thus represented in different spectral colors and are superposed on the encoding line 210a. "Image strips" of an image are to mean, in this context, image columns forming the image column by column, in a manner similar to pixel columns of a digital image, an image being of course built in a continuous fashion from a virtually infinite number of image strips. While, in the present case, "image strips" are thus to be understood to be correspondingly analogous to "image parameters", they build up the image in a direction that is rotated by approximately 90° relative to image parameters. In FIG. 5b a decoding step is illustrated in the dispersion diagram. Light of the spectrally encoded image 200a corresponds to a stack of different image strips having different spectral colors. When viewed through a dispersive element (not shown), the spectrally encoded image 200a is sheared as the image strips are offset by different amounts depending on their respective spectral color and/or light wavelength. As a result, the different image strips are fanned out, sorted according to color, respectively according to wavelength. This results in a rainbow-colored version of the grayscale original image.

FIG. 6 shows, as an advancement with respect to the prior art, a dispersion diagram for a generation of a second exemplary spectrally encoded image 218a from a second exemplary original image. The second exemplary original image is in the present case a color image realized by a row of a red component image, a green component image and a blue component image. In the same way as shown in FIG. 6a, RGB component images of the second exemplary original image are projected through a dispersive element (not shown), resulting in three RGB basic images 222a, 224a, 226a of the spectrally encoded image 218a being generated on a screen that is represented by an encoding line 228a. A red component image of the second exemplary original image corresponds to a stack of red long-wavelength individual images. A green component image of the second exemplary original image corresponds to a stack of green mid-wavelength individual images. A blue component image of the second exemplary original image corresponds to a stack of blue short-wavelength individual images. Upon projection through the dispersive element, e.g. an optical prism or a diffraction grating, each of the component images is sheared as the individual images of the component images having different wavelengths are offset by different amounts. In this way, different long-wavelength, i.e. red image strips from the red component image of the second exemplary original image, different mid-wavelength, i.e. green image strips from the green component image of the second exemplary original image and different short-wavelength, i.e. blue image strips from the blue component image of the second exemplary original image arrive on a screen. Different image strips of the second exemplary original image are thus represented by different, but colorwise similar, light wavelengths, and are superposed on the encoding line 228a.

In FIG. 6b a decoding step is shown in the dispersion diagram. The light of the spectrally encoded image 218a on the encoding line 228a corresponds to a stack of different image strips having different spectral colors. When viewed through a dispersive element, this stack is sheared as the image strips are offset by different amounts according to spectral color, respectively light wavelength. As a result, the different image strips are lined up, sorted according to color or wavelength, respectively. This results in elementary images of the copy image which are, in comparison to the RGB component images of the second exemplary original image, spectrally reduced but similar in color. These elementary images, which are situated side by side, must then be brought into superposition. This may be effected optically, e.g. by reflection from reflective surfaces, via computer technology or by a combination of the two. Due to, in particular three, dispersion processes of different degrees, it may occur that the relative brightness of the elementary images does not resemble the relative brightness of the corresponding component images (in the dispersion diagram the corresponding stacks have, for example, different thicknesses). However, by a suitable adaption of the brightness of the component images it is possible to generate the desired RGB copy image.

A further possible method is given by projecting the original image through a diffraction grating, using the fourth, fifth and sixth diffraction orders. In accordance with the general grating equation $$m\lambda = d \cdot \cos(\varepsilon) \cdot (\sin(\alpha) + \sin(\beta)),$$

in which m is a diffraction order, $\lambda$ is a wavelength, d is a distance between neighboring grating lines of a grating, $\varepsilon$ is an angle between a plane that is perpendicular to the grating lines and the incident, respectively diffracted beam, $\alpha$ is an incident angle and $\beta$ is a diffraction angle, spectra of the fourth, fifth and sixth diffraction orders are superposed in such a way that the red, green and blue spectral bands coincide. Conversely, the encoded light is decodable by a diffraction grating in the fourth, fifth and sixth diffraction orders.

FIG. 7 shows a dispersion diagram for a generation of a third exemplary spectrally encoded image 230a from a third exemplary original image by means of three dispersive elements (not shown). The third exemplary original image is a color image. In FIG. 7a an encoding step is shown in the dispersion diagram. The third exemplary original image corresponds to a stack of (monochromatic) individual images of different light wavelengths, where long-wavelength, mid-wavelength and short-wavelength individual images of the third exemplary original image generally differ regarding their brightness modulation as the three spectral bands represent three different RGB component images. Upon projection through three different dispersive elements, three stacks 236a, 238a, 240a result, which are sheared by different amounts, as the individual images are offset by different amounts according to light wavelength and to the degree of the dispersion. As a result of this, different long-wavelength, i.e. red image strips from the first stack 236a, different mid-wavelength, i.e. green image strips from the second stack 238a and different short-wavelength, i.e. blue image strips from the third stack 240a arrive on an encoding line 234a, where they compose a red basic image 242a, a green basic image 244a and a blue basic image 246a. Different image strips of the third exemplary original image are thus respectively represented in red, green and blue spectral colors and are superposed on the encoding line 234a.

FIG. 7b shows a decoding step in the dispersion diagram. The light on the screen corresponds to a stack of different image strips in red, green and blue spectral colors. Upon viewing through three different dispersive elements, three stacks are created which are sheared by different amounts, because the image strips are offset by different amounts according to their respective spectral color and to a degree of the dispersion. As a result of the partial superposition of the sheared-off stacks, the lined-up image strips are superposed to form elementary images of a copy image of the original image according to the RGB color mixing principles. Due to the superposition of red, green and blue elementary images, the copy image of the third exemplary original image is a version of the colored third exemplary original image that is spectrally reduced but similar in color, a so-called RGB copy image. Furthermore, generally several secondary copy images are generated, namely two secondary copy images with a red image component, two secondary copy images with a green component and two secondary copy images with a blue component. Depending on an implementation, some secondary images may as well be superposed on one another.

FIG. 8 shows an image-based construction method for a generation of an exemplary fourth spectrally encoded image 248a and its decoding. The spectrally encoded image 248a is generated by a projection of a fourth exemplary original image 250a onto a one-dimensional screen 252a by means of a projector (not shown). The original image 250a is here projected through three identical diffraction gratings (not shown), which are arranged one behind the other one and mutually rotated, for the purpose of generating the spectrally encoded image 248a. The screen 252a is in the present case arranged in such a way that a first diffraction order of the diffraction gratings is projected onto the screen 252a. The spectrally encoded image 248a generated on the screen 252a is viewed, from a suitable position, through identical diffraction gratings, which are mutually rotated in the same way. A viewer then sees a copy image 257a corresponding to the original image 250a in regard to colors and sees some secondary copy images 259a, not all of which have been given a reference number for the sake of a better overview. The secondary copy images 259a and in particular the copy image 257a appear as virtual images in mid-space to the side of the screen.

Starting from two principal assumptions, an image displacement and an image superposition in spectral encoding and decoding may be constructed.

1. Rotational Invariance

When the diffraction grating is rotated, the dispersive offset between two individual images is constant as long as the distance of the diffraction grating to the screen is preserved. This rotational invariance is due to the diffractive properties of the diffraction grating. When the diffraction grating is rotated, the center points of the individual images move on concentric circular paths having a common center that coincides with the center point of the original image.

2. Congruency

An image displacement for decoding is equal but opposite to the image displacement for encoding as long as the diffraction gratings for decoding and the eye are arranged in a rotationally symmetrical fashion relative to the diffraction gratings for the encoding and to the projector, the rotational axis being the one-dimensional screen. Under this condition the original image and the RGB copy image are congruent. This congruency is due to the reversibility of light paths and to the equivalence of projector and eye.

Figure 8A:
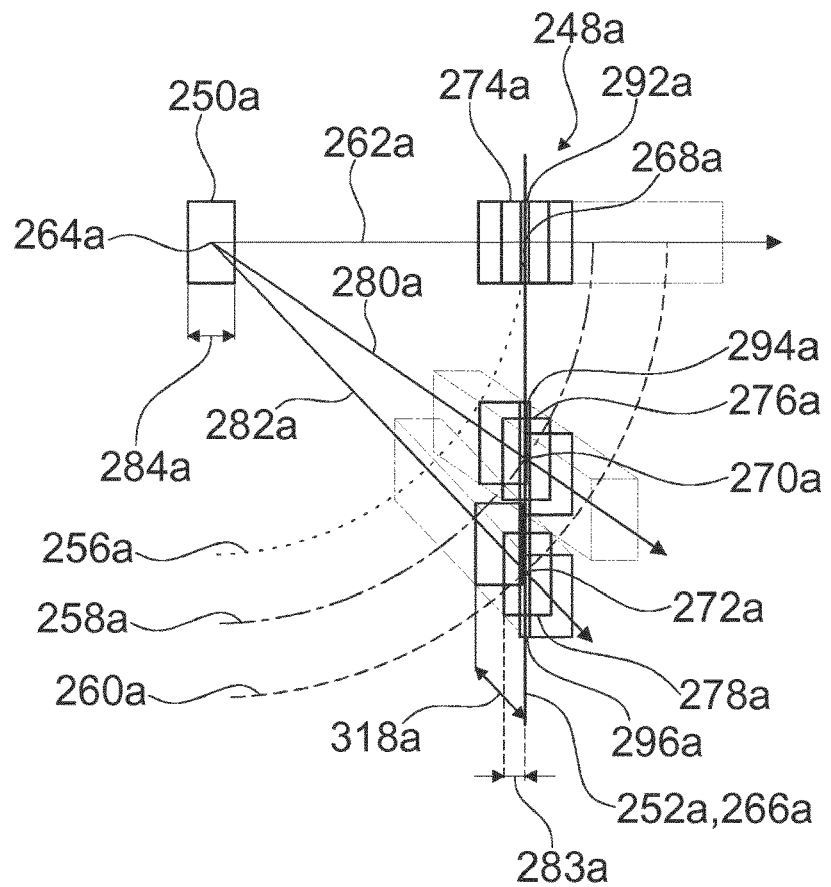

In FIG. 8a an image-based construction for an encoding step is illustrated. This figure illustrates the imaging method in a front view. To provide a better overview, in FIG. 8 three individual images are depicted, in an emphasized fashion, per spectral band. Actually, of course a virtually infinite number of individual images will appear.

1. Spectral Bands

Draw concentric circles 256a, 258a, 260a having radii in a ratio of 9:11:13 (450 nm:550 nm:650 nm) around the center point 264a of the original image 250a. They represent the first diffraction orders of shortwave, midwave and longwave light.

2. Horizontal Dispersion

Draw a horizontal line 262a through the center point 264a of the concentric circles 256a, 258a, 260a. This line represents the dispersion direction required for the encoding of the blue individual images.

3. Encoding Line

Draw a vertical line 266a through the intersection point 268a of said horizontal line 262a and the circle 256a for shortwave light. This line represents the encoding line 252a, i.e. the location of the one-dimensional screen.

4. Image Centers

Mark three points 268a, 270a, 272a, in which the vertical line 266a intersects with the different circles 256a, 258a, 260a. These points 268a, 270a, 272a constitute the center points of a blue, green or red individual image 274a, 276a, 278a, which are generated in a projection of the original image 250a through the dispersive elements.

5. Dispersion Directions

Connect each of the three points 268a, 270a, 272a to the center point 264a of the original image 250a. The three resulting connection lines 262a, 280a, 282a provide the three dispersion directions required for encoding the respective blue, green and red image strips of the original image 250a.

6. Image Width

Measure the horizontal distance 283a between the center point of the red individual image, which has the shortest wavelength and is directly adjacent to the encoding line, and the vertical line, i.e. the encoding line 266a. Twice the amount of this distance 283a will be equivalent to the maximum width 284a of the original image 250a and thus the maximum width of the individual images.

7. Spectra

Along each of the three dispersion directions 262a, 280a, 282a, draw respectively one complete spectrum consisting of a plurality of individual images. For a spectral foil having a given grating constant, the offset between two individual images is constant along the dispersion direction. Individual images having the same wavelength are thus situated on concentric circles.

From the superposition of different image strips on the screen 252a result a blue basic image 292a, a green basic image 294a and a red basic image 296a on the screen, which together implement the image 248a.

Figure 8B:
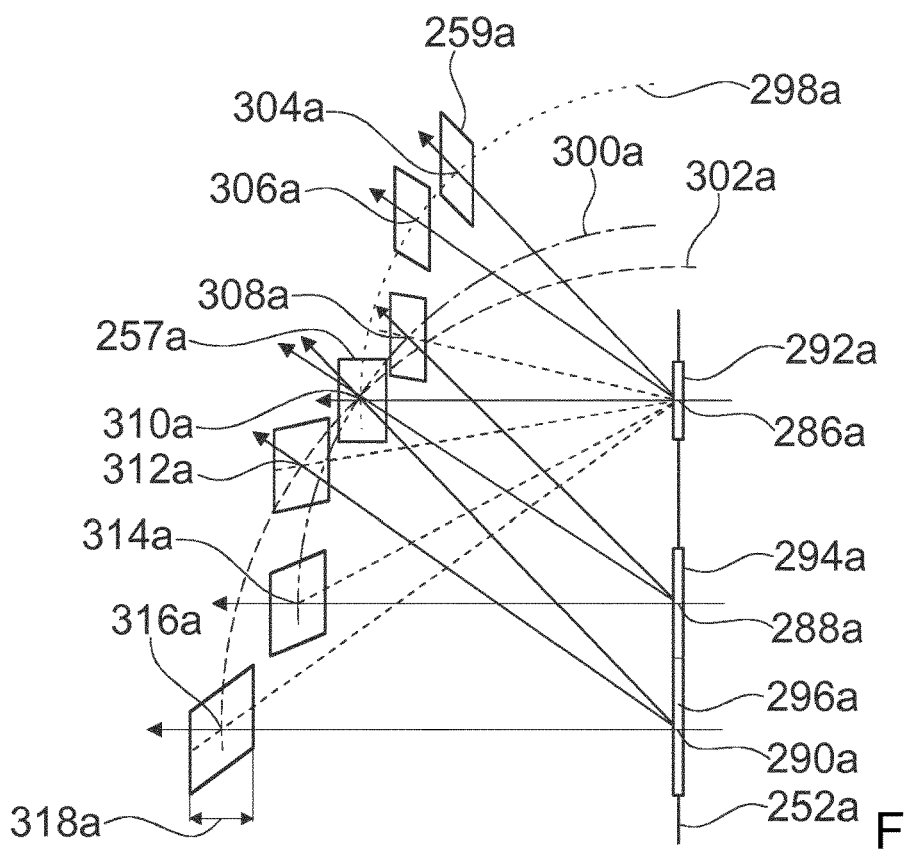

In FIG. 8b an image-based construction is illustrated for a decoding step. It shows the imaging method in a front view.

1. Spectral Bands

Draw, on the screen 252a, concentric circles 298a, 300a, 302a around the center points 286a, 288a, 290a of a blue basic image 292a, a green basic image 294a and a red basic image 296a of the spectrally encoded image 248a, the circles 298a, 300a, 302a having radii in a proportion of 9:11:13. They represent the first diffraction orders of short-wavelength, mid-wavelength and long-wavelength light.

2. RGB Copy Image

Put in the location of the original image relative to the encoding line. This location corresponds to the location of the copy image 257a.

3. Dispersion Directions

Transfer dispersion directions from the schema for encoding into the schema for decoding.

4. Strip Centers

Mark such seven points 304a, 306a, 308a, 310a, 312a, 314a, 316a, in which the lines implementing the dispersion directions intersect with the left half of the corresponding circles. These intersection points constitute the center points of respective blue, green and red image strips from the center of the original image 250a.

5. Placement Lines

Connect each of the seven intersection points 304a, 306a, 308a, 310a, 312a, 314a, 316a, respectively, to the center point of the blue basic image 292a on the screen. The resulting seven connection lines may then be denominated placement lines (which have no reference numerals for overview purposes) because the center points of the image strips are placed thereon.

6. Dispersive Offset

Measure, along each respective dispersion direction for encoding, the offset 318a between the outer encoded individual images. This offset 318a for encoding corresponds to the offset for decoding.

7. Secondary Copy Images

Along each of the seven placement lines, draw the two respective outer image strips of the secondary copy images 259a. Along the respective dispersion direction, not along the placement line, transfer the offset just measured.

Analogously it is possible to illustrate the spectral encoding and decoding using parallel diffraction gratings of different line densities (cf. FIG. 9). The line densities of the different parallel diffraction gratings here correspond to the geometrical projection of the line densities of the mutually rotated diffraction gratings. Said line densities may therefore be calculated as a product of the line density $g_r$ of the rotated diffraction gratings and the cosine of the angle $\alpha$ of the respective rotated grating relative to the dispersion direction for the blue image component:

$$g_p = g_r \cos(\alpha).$$

According to the above explanations, when using three rotated dispersive elements a spectrally encoded image may be viewed for decoding only from a certain position, for the purpose of generating a copy image, in particular a clear copy image, of an original image. However, the methods according to the invention will advantageously be independent from a viewer's/viewers' positions if dispersive elements with parallel dispersion directions are used, which are in particular arranged one behind the other one and/or advantageously side by side in a fine-mesh implementation.

Figure 9A:
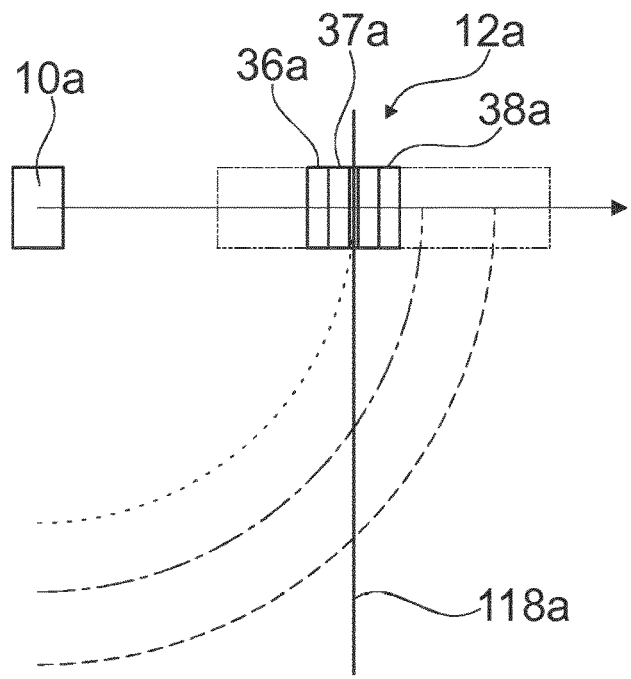
Figure 9B:
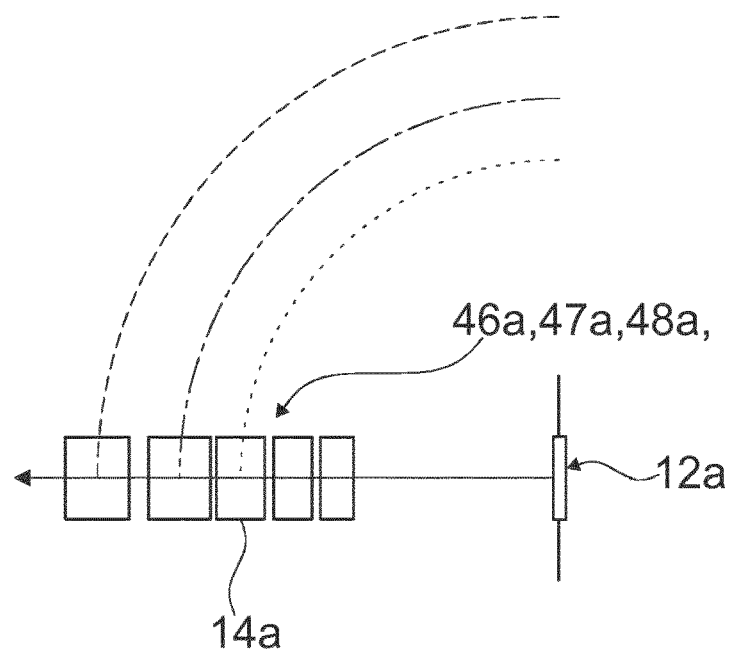

FIG. 9 shows, in analogy to FIG. 8, a schematic representation of a generation of the spectrally encoded image 12a (cf. FIG. 9a) and its decoding (cf. FIG. 9b) by means of the encoding device 106a and the decoding device 108a (cf. FIG. 1), which are not shown in FIG. 9 for purposes of overview. In the method for generating a spectrally encoded image 12a, the spectrally encoded image 12a is generated from the original image 10a. The copy image 14a of the original image 10a is generated based on the spectrally encoded image 12a in the method for decoding a spectrally encoded image 12a.

The first transformation step and/or the second transformation step are carried out with at least one dispersive element 60a, 62a (cf. FIGS. 10 and 11). The first and second transformation steps are carried out with different dispersive elements 60a, 62a. In the present case the first transformation step is carried out with a first dispersive element 60a. Furthermore, the second transformation step is in the present case carried out with a second dispersive element 62a. The first transformation step and the second transformation step are realized in different spectral bands 50a, 52a. Furthermore, at least one third transformation step is carried out in a third spectral band 54a. The third transformation step is carried out by means of a third dispersive element 64a (cf. FIGS. 10 and 11). The different spectral bands 50a, 52a, 54a here respectively correspond to a respective basic color, in the present case blue, green and red. As shown in particular in FIGS. 3 to 5, the spectrally encoded image 12a comprises the basic images 36a, 37a, 38a in different basic colors, which together encode the original image 10a at least approximately in true-coloring. It is further apparent from FIG. 1 and from FIGS. 3 to 5 that the spectrally encoded image 12a is spatially at least substantially one-dimensional.

When defining a direction parameter $$\Omega=\Omega(\varepsilon,\alpha,\beta)=\cos(\varepsilon)\cdot(\sin(\alpha)+\sin(\beta))$$

the following applies to a first diffraction order (m=1)

$$\lambda_i=\Omega d_i, \; i=1,2,3.$$

Consequently, for any direction parameter $\Omega$ $$\lambda_1/\lambda_2/\lambda_3=d_1/d_2/d_3.$$

Independently from a direction parameter, when using different diffraction gratings there is hence a fixed proportion between three wavelengths $\lambda_1$, $\lambda_2$ and $\lambda_3$, for example wavelengths of a blue, a green and a red image strip. For parallel diffraction gratings thus a certain image strip of a certain spectral band always occurs in superposition with certain image strips of other spectral bands.

Principally it is possible to carry out any desired number of transformation steps by using a corresponding number of dispersive elements. In this way, for example any other color mixing than an RGB color mixing is realizable. In particular, at least two, advantageously all encoding steps may be carried out at least substantially simultaneously. In particular, at least two, advantageously all decoding steps may be carried out at least substantially simultaneously. In particular, it is possible to carry out at least one encoding step and at least one decoding step at least substantially simultaneously.

As shown in FIGS. 10 and 11, the dispersive elements 60a, 62a, 64a comprise parallel diffraction gratings 61a, 63a, 65a. The dispersive elements 60a, 62a, 64a are furthermore arranged immediately behind one another. Due to this arrangement, respectively the same three wavelengths (e.g. 450 nm, 550 nm and 650 nm) occur along a viewer's viewing direction toward the spectrally encoded image 12a. In particular, in any desired viewing direction, the first basic image 36a, the second basic image 37a and the third basic image 38a, respectively—after viewing through the dispersive elements 60a, 62a, 64a—the first elementary image 46a, the second elementary image 47a and the third elementary image 48a of the copy image 14a appear in superposition. Here it must be taken into account that for the encoding and the decoding optically identical first dispersive elements 60a, optically identical second dispersive elements 62a and optically identical third dispersive elements 64a are used, which are consequently given the same reference numerals although they are, of course, fitted in the encoding device 106a in the one case and in the decoding device 108a in the other case. "Optically identical" is in particular, in this case, to mean identical in regard to dispersion behavior, and advantageously comprising diffraction gratings having identical grating constants. Of course it is principally conceivable to mutually adapt the distances between dispersive elements and their dispersive characteristics in such a way that it is also possible to use optically different dispersive elements for encoding and decoding. It is moreover conceivable, when projecting an original image, to effect a pre-distortion of the original image, resulting in corresponding adaptions of the dispersive elements and/or of their arrangement.

A construction principle for the spectrally encoded image 12a generated from the original image 10a (cf. FIG. 9a) and a construction principle for the copy image 14a of the original image 10a, which is generated from the spectrally encoded image 12a (cf. FIG. 9b), are both based on the construction principle for the case of mutually rotated diffraction gratings that has been described above (cf. FIG. 8). In practice, parallel diffraction gratings will be preferred, in particular due to their above-mentioned independency from a viewer position. However, rotated diffraction gratings facilitate a theoretical analysis of the imaging process in the context of the image-based construction method.

For further illustration, FIG. 10 shows a front view of three superposed basic images 36a, 37a, 38a of the spectrally encoded image 12a and elementary images 46a, 47a, 48a of a copy image 14a of the original image 10a. To provide an overview, three monochromatic individual images having a specific wavelength of approximately 550 nm are emphasized from the middle spectral band 52a. The situation for other wavelengths will be obviously inferable for a person skilled in the art. The dashed line indicates an entirety of all individual images, i.e. a spectrum of individual images, respectively a region which these individual images are projected into. A corresponding monochromatic beam 120a is considerably deflected at the first dispersive element 60a having a high line density, it is moderately deflected at the second dispersive element 62a having a medium line density, and it is slightly deflected at the third dispersive element 64a having a low line density (cf. FIG. 10a). According to the grating equation given above, beams of a greater wavelength are deflected by a respectively greater amount and beams of a smaller wavelength are deflected by a respectively smaller amount. Respectively diffracted beams 122a, 124a, 126a are deflected towards different locations 128a, 130a, 132a. A corresponding monochromatic individual image, and thus the entire spectrum of the projected original image 10a, will appear in different locations for different line densities (cf. the three individual images shown in the locations 128a, 130a, 132a). In particular, three diffraction gratings having different line densities result in three respectively offset spectra of different lengths. These spectra of different individual images are superposed in such a way that different image strips respectively coincide in blue, green and red on the screen 118a.

For decoding the spectrally encoded image 12a (cf. FIG. 10b) a beam having a given wavelength of the spectrally encoded image is deflected by different amounts, according to a line density of the diffractive grating of the respective dispersive element 60a, 62a, 64a, and therefore seems to originate from respectively different locations 138a, 136a, 134a. The offset image strips of different wavelengths are lined up to form elementary images, among which three elementary images 46a, 47a, 48a are superposed to form the RGB copy image 14a. In addition, further elementary images are generated, which are superposed in pairs to form RG and GB secondary copy images, or, respectively, which appear as single R and B secondary copy images. Single R and B secondary copy images will also be visible. The elementary images 46a, 47a, 48a here respectively have, along their x-coordinates, a wavelength gradient extending from a righthand image border to a lefthand image border over the corresponding spectral band 50a, 52a, 54a. For example, the righthand image border of the first elementary image 46a has in the present case a wavelength of approximately 400 nm and the lefthand image border of the first elementary image 46a has a wavelength of approximately 500 nm.

FIG. 11 shows an arrangement of the dispersive elements 60a, 62a, 64a of the device in a schematic representation. The dispersive elements 60a, 62a, 64a are arranged immediately behind one another. The dispersive elements 60a, 62a, 64a each comprise a diffraction grating 61a, 63a, 65a. The first dispersive element 60a further comprises a prism arrangement 66a comprising a plurality of prisms 67a, 68a, 69a, etc. The depicted arrangement of the dispersive elements 60a, 62a, 64a allows a viewing of a first diffraction order in an at least substantially straight direction.

FIGS. 12 to 17 show further exemplary embodiments of the invention. The following descriptions and the drawings are limited substantially to the differences of the exemplary embodiments while, regarding identically referenced structural components, in particular regarding components having the same reference numerals, the drawings and/or the descriptions of the other exemplary embodiments, in particular of FIGS. 1 to 11, may principally also be referred to. For the purpose of distinguishing between the exemplary embodiments, the letter a has been added to the reference numerals of the exemplary embodiment of FIGS. 1 to 11. In the exemplary embodiments of FIGS. 12 to 17 the letter a has been substituted by the letters b to g.

For the majority of practical applications secondary copy images are superfluous or even outright disturbing. Firstly it must be taken into consideration that during image viewing a dispersive element acts like a window through which the spectrally encoded image is viewed. If the window is sufficiently small, occurring secondary copy images will be invisible insofar as they are situated, in terms of perspective, outside an imaginary window frame. If, for any size of the window, a viewing of secondary copy images is to be avoided, the dispersive elements for viewing are arranged not behind each other but next to each other, with small sections periodically alternating, e.g. in the form of strips.

Various alternative arrangements of dispersive elements 60.1b, 62.1b, 64.1b, 60.2b, 62.2b, 64.2b, 60.3b, 62.3b, 64.3b are shown in FIG. 12. By means of additional different color filters on the different dispersive elements and/or by a certain profile of the respective diffraction grating it is possible to optimize dispersion strips 142b, 144b, 146b with specific dispersive features in such a way, in regard to their respective spectral characteristics, that in each case only the relevant spectral band is transmitted, other spectral bands being absorbed or being deleted by destructive interference. Each of these dispersion strips 142b, 144b, 146b should, on the one hand, be sufficiently narrow such that it can hardly be spatially resolved by a human and/or technical eye; but each should, on the other hand, have a sufficient width to avoid undesired diffraction effects. Therefore each dispersion strip 142b, 144b, 146b should have a width of approximately 0.5 mm to 20 mm, depending on a specific application.

The dispersion strips 142a, 144a, 146a may extend parallel, perpendicular or transverse to a dispersion direction. Dispersion arrangements composed of strips should either have a sufficiently large distance from the eye such that the individual dispersion strips 142b, 144b, 146b are almost imperceptible, or should be located so close to the eye that the beam cone from a given image point to the pupil of the eye goes through at least three different dispersion strips 142b, 144b, 146b simultaneously. This is to ensure that the copy image of the original image will itself appear free of strips. Instead of dispersion strips 142b, 144b, 146b, segments having different shapes may be used, e.g. triangles, pentagons, hexagons and/or other polygons or shapes.

Depending on a field of application, it is also possible to use—instead of dispersive elements—a spectral-scanning device which, for example, sequentially transmits and/or receives individual portions of a spectrally encoded image through narrowband color filters and positions these portions side by side or superposes them, optically (e.g. by means of movable mirrors) or by way of computer technology. If required, it is here possible to make use of the persistence of human vision as a high-frequency sequencing (f>25 Hz) will be perceived as a simultaneity.

The methods and devices described may be employed at least partially as display technologies. In particular, the advantages of all-around visibility and/or mirror-immunity may be made use of. For example, an image-generating system according to the invention may be used in a head-up display or as an image-generating system for a conference hall or as a home cinema system, or the like. In particular, as a spectrally encoded image appears as a copy image of an original image only when viewed through at least one suitable adequate dispersive element, more or less private and/or personal displays are realizable. In particular, different spectrally encoded images may be rendered available for different viewers on a shared screen via different viewing elements.

If the described methods are employed alternatively to a spectrally encoded image acquisition, advantageously no complex color filtering is required. Moreover, additional mirrors may be dispensed with. Furthermore no computation is necessary for image superposition. A necessary scanning movement is also advantageously reducible.

Furthermore a projector-independent implementation of the described methods and devices is conceivable. It is here in particular possible to use an active screen and/or a direct light source, where it is advantageously possible to use tunable lasers or LED light sources with a spectrum that is adjustable as desired. Such a screen could, for example, be embodied as a thin vertical rod generating a plurality of points of a spectrally encoded image above one another, the image being viewable by a viewer through a suitable decoding device. It is also conceivable to realize such a screen in such a way that light from a spectrally encoded image is coupled into the screen from below and is decoupled from the screen sidewise in a suitable place. To decouple the light specifically in certain positions, such a screen could, for example, comprise at least one optical waveguide and/or at least one movable mirror. This would allow realizing increased brightness and/or an independency from a projector and/or an improved light yield. A corresponding device could in particular be embodied as a mobile device and/or could allow usage under difficult lighting conditions.

It is also conceivable to generate a white slit image and to disperse said slit image into a slit spectrum in a suitable manner. It is then possible to carry out a brightness modulation, for example in three, in particular disjunct, spectral bands, which are advantageously selected according to an RGB color mixing where, for example, corresponding to three component images of an original image, for example three proto-elementary images may be generated with an information content that respectively corresponds to an information content of, for example, three basic images of a spectrally encoded image. Following the brightness modulation, the proto-elementary images are recombined into a slit image to create a spectrally encoded image.

Further it is possible, in adapted methods, to generate and/or view a plurality of spectrally encoded images simultaneously. It is thus possible to create hologram-like copy images and/or different copy images and/or seemingly floating copy images, which would in particular be visible from different viewing positions. An imaging of three-dimensional objects would also be possible. Beyond this, in particular applications in the fields of semi-augmented reality (SAR), augmented reality (AR), virtual reality (VR) and/or mixed reality (MR) are conceivable in this context.

It is also conceivable to use the described methods and/or devices in an adapted fashion for computer spectacles/augmented reality spectacles and/or in a computer contact lens/smart contact lens. For example, such a spectacle glass or such a contact lens could comprise dispersive elements, in particular actively controlled dispersive elements, and/or suitable sensors which are, for example, capable of registering position information of a user, ambient light parameters or other environment parameters.

FIG. 13 shows a further image-generating system 110c with an encoding device 106c and a decoding device 108c in a schematic presentation.

The encoding device 106c comprises at least one encoding unit 102c, which is designed for encoding at least one first original image parameter into at least one first image parameter that is dependent on at least one spectral coordinate of a spectrally encoded image 12c. The encoding unit 102c is designed for encoding of a second original image parameter into at least one second image parameter that is dependent on the spectral coordinate of the spectrally encoded image 12c. The encoding unit 102c comprises a screen 118c. The screen 118c is embodied as an at least substantially one-dimensional active screen. The screen 118c is designed to generate the spectrally encoded image 12c directly by means of suitable, at least substantially point-like light sources, which are arranged above one another and whose spectra are respectively adjustable as needed. Principally, of course other geometries for in particular active screens are also conceivable. For example, point-like light sources may advantageously be as well arranged side by side or planarly in certain patterns, for showing a spectrally encoded image, in particular directly. The encoding unit 102c comprises a computing unit 320c, which computes a digital representation of the spectrally encoded image 12c from the original image and accordingly controls the screen 118c in such a way that the spectrally encoded image is represented by the screen 118c.

The decoding device 108c is designed to generate a copy image of an original image from a spectrally encoded image 12c. The decoding device 108c comprises at least one decoding unit 104c, which is designed for decoding at least one first copy image parameter from at least one first image parameter, which is dependent on at least one spectral coordinate of the spectrally encoded image 12c. The decoding unit 104c is designed for decoding at least one second copy image parameter from at least one second image parameter, which is dependent on the spectral coordinate of the spectrally encoded image 12c.

The decoding unit 104c comprises a viewing element 322c. The viewing element 322c is in the present case embodied as a cylinder encompassing the screen 118c. The viewing element 322c comprises several layers of dispersive films forming a surface 324c of the viewing element 322c. It is of course also conceivable that, alternatively or additionally, a respective viewing element comprises dispersion segments arranged so as to be mutually adjacent. The dispersive films are arranged analogously to the dispersive elements of the exemplary embodiment in FIGS. 1 to 11 and in particular allow an implementation of at least three decoding steps. When viewing the spectrally encoded image 12c through the viewing element 322c, the copy image of the original image appears from different viewing positions. In particular, the copy image of the original image is viewable both from viewing positions around the viewing element 322c and from positions within a space that is encompassed by the viewing element 322c. In the latter case, it is possible to view a reflected image of the screen 118c by means of the viewing element 322c. Depending on a realization of the viewing element 322c, secondary copy images may also come into sight.

Principally an arrangement is conceivable that comprises, like in the exemplary embodiment of FIGS. 1 to 11, a projector and in particular a passive screen. A corresponding viewing element then has, for example, at least one hole and/or slit, through which it is possible to generate a spectrally encoded image on the screen via projection. Alternatively it is also conceivable that a projector projects the image onto a screen from a position obliquely below or above the screen, for example from a position inside or outside a space that is defined by a viewing element.

FIG. 14 shows a first alternative encoding device 106d in a schematic representation. FIG. 14 illustrates a possible arrangement for a generation of a spectrally encoded image 12d. The spectrally encoded image 12d may, for example, be generated on a screen 118d via projection. The first alternative encoding device 106d comprises a light source 326d. In the present case the light source 326d is a line-type and/or line-shaped light source. The light source 326d may, for example, be a high-pressure xenon lamp or may also be an, in particular sharp or blurred, copy image of such a lamp, for example on a slit aperture, in particular with a convex lens. The first alternative encoding device 106d comprises at least one dispersive element 60d, which is in the present case exemplarily combined with an imaging optics unit 328d, e.g. a lens and/or a concave mirror or the like. By means of the dispersive element 60d light, preferably white light, of the light source 326d is here split up spectrally. Dispersed light is in the present case projected onto a Spatial Light Modulator 330d. Different spectral components of the light source 326d thus appear in different places of the Spatial Light Modulator 330d. This advantageously allows specifically adapting their intensities. The Spatial Light Modulator 330d may be combined with a suitable imaging optics unit 346d. By means of the Spatial Light Modulator 330d basic images are generated, for example in accordance with a mixing of basic colors. The Spatial Light Modulator 330d may here be, for example, controllable via a suitable control unit, the control unit preferentially determining, in particular computing, the encoded image from an original image by at least one encoding routine. In particular by temporally variable control of the Spatial Light Modulator 330d, it is also possible to generate in this way spectrally encoded videos. By means of the Spatial Light Modulator 330d, it is further possible to effect specified distortions and/or intensity modulations, for example to achieve optimum precision regarding the congruency of the original image and a copy image of the original image that is decoded from the encoded image 12d. In particular, this allows an adaptation to dispersive elements, imaging optics, geometrical arrangements and the like of a decoding device. Light that goes through the Spatial Light Modulator 330d and is modulated is projected onto the screen 118d by means of a further dispersive element 62d of the first alternative encoding device 106d, in particular in a combination with a suitable imaging optics unit 348d. Here in particular the light gets focused, as a result of which a high-level light yield is achievable. Thus, for example, an at least substantially one-dimensional encoded image 12d may be generated on the screen 118d.

FIG. 15 shows a second alternative encoding device 106e in a schematic representation. The second alternative encoding device 106e is principally implemented analogously to the first alternative encoding device 106d of FIG. 14. However, a light source 326e of the second alternative encoding device 106e additionally comprises at least one concave mirror 332e, which is arranged in a projection direction behind an illuminant 334e of the light source 326e, e.g. a high-pressure xenon lamp. The light source 326e further comprises at least one condenser lens 336e. The condenser lens 336e focusses light of the illuminant 334e to a slit 338e with at least one convex lens 340e. Such or similar arrangement of optical components advantageously allows further increasing a light yield, in particular due to the concave mirror 332e. Moreover the imaging quality is further increasable, in particular in comparison to an arrangement according to FIG. 14.

FIG. 16 shows a third alternative encoding device 106f in a schematic representation. The third alternative encoding device 106f comprises at least one light source 326f. Moreover the third alternative encoding device 106f in its turn comprises a Spatial Light Modulator 330f. Instead of a dispersive element between a light source and the Spatial Light Modulator 330f, the third alternative encoding device 106f comprises at least one rainbow filter 342f. By means of the rainbow filter 342f, it is possible that a spatially split-up spectrum of a white light of the light source 326f is created and is imaged onto the Spatial Light Modulator 330f for a further modulation according to a spectrally encoded image 12f that is to be generated. The rainbow filter 342f may, for example, comprise a linear variable filter. Preferably the rainbow filter 342f comprises at least two linear variable filters, which are in particular superposed and/or arranged behind one another, and which are preferentially slightly offset relative to each other. Advantageously light here hits the linear variable filters of the rainbow filter 342f, if possible, parallel and/or perpendicularly, in particular for the purpose of avoiding undesired broadening of individual spectral bands and/or achieving a precise relation between spectral color and location. The third alternative encoding device 106f further comprises at least one dispersive element 60f, in particular in a combination with imaging optics through which modulated light can be imaged onto a screen 118f. Here the rainbow filter 342f and the dispersive element 60f are advantageously adapted to each other in such a way that basic images and/or image strips for the spectrally encoded image 12f generated via the Spatial Light Modulator 330f are superposed on the screen 118f, as a result of which a high light yield and/or high resolution are/is advantageously achievable.

Of course any desired combination of the exemplary embodiments shown in FIGS. 14 to 16 is conceivable. Principally it is possible, via a Spatial Light Modulator, to generate a spectrally encoded image in a manner analogous to the method shown in particular in FIG. 6, where basic images are, for example, imaged on a screen above one another. However, other versions for spectrally encoded images are also conceivable. It is for example possible to generate spectrally encoded images in mosaic implementations where, for example, a mosaically structured original image (which could be analogous to a display image consisting of mosaic-like pixels, e.g. RGB pixels, RGBW pixels or any other color mixing) is spectrally encoded. A copy image of the original image would in such a case have pixels that are also structured in a mosaic manner.

FIG. 17 shows an alternative dispersive element 344g. The alternative dispersive element 344g is embodied as a manifold line grating. The alternative dispersive element 344g may, for example, form a plurality of dispersive elements. In particular, the alternative dispersive element 344g may be used alternatively to an arrangement of different dispersive elements behind one another and/or side by side like, for example, in other exemplary embodiments. Here, for example, a shifting and/or a faulty arrangement of dispersive elements are/is avoidable. In the present case the dispersive element 344g is embodied as a three-fold line grating. The dispersive element 344g comprises a plurality of optical gratings, which have different grating constants and are rotated relative to each other. Here rotation angles between these rotated optical gratings are freely adaptable, at least within the limits of the superposition of elementary images that is to be achieved, for example for the purpose of influencing a location in which secondary copy images appear. It is also conceivable that at least two of the optical gratings and/or some of the optical gratings or even all of the optical gratings are arranged in parallel. In particular, parallel lines may also be located directly on one another and/or may coincide. Furthermore the dispersive element 344g may comprise a plurality of optical gratings having the same grating constant, which may also be rotated or parallel to one another. Principally parameters of the dispersive element 344g, such as rotation angles, grating constants, a number of optical gratings and/or their positions, may be mutually adapted as required.

In the following, by way of examples, possible arrangements of optical elements, projection unit, screen, viewer and the like will be described. Principally any other arrangement is also conceivable. The values mentioned are here to be understood in a purely exemplary fashion.

It is for example conceivable that a projection unit projects an original image, in particular its superposed RGB component images, through two direct-vision prisms which are arranged behind one another. A screen, realized as a matte-polished, preferentially translucent rod, e.g. an acrylic-glass rod, could be arranged behind the direct-vision prisms at a distance of approximately 3 m. A diameter of the rod could be, for example, 3 mm or 5 mm or preferably 7 mm, but could also be 10 mm or any value in-between. Even narrower screens are also conceivable, for example having a diameter of 1 mm or 2 mm. A length of the rod could be approximately 0.7 m. For decoding purposes, spectral spectacles could be used, in particular having three different dispersive elements. Here, for example, using a grating with approximately 450 lines/mm, in particular for a red basic image, a grating with approximately 550 lines/mm, in particular for a green basic image, and a grating with approximately 650 lines/mm, e.g. for a blue basic image, is conceivable. Viewing is preferentially done at a distance of e.g. 1 m from the screen. To optimize a superposition of spectrally encoded basic images, an, in particular computer-generated, pre-distortion and/or brightness modulation of the projected original image and/or of its component images are/is also conceivable.

An arrangement like the following is also conceivable: A projection of an original image could be effected, for example, by means of a suitable projection unit through three diffraction foils. A first diffraction foil could, for example, have approximately 1020 lines/mm. A second diffraction foil could, for example, have approximately 1200 lines/mm. A third diffraction foil could, for example, have approximately 1380 lines/mm. Of course a multifold line grating is also conceivable instead of a plurality of diffraction foils. At a distance of 1.4 m from the diffraction foils a translucent rod, in particular a matte-polished rod, which is preferably made of an acrylic glass, could be arranged as a screen. A length of the rod could be, for example, approximately 0.5 m, and a diameter could be, for example, 1 mm. For decoding, spectral spectacles could be used, in particular having diffraction foils and/or optical gratings with an identical number of lines per mm as in the case of the first, second and third diffraction foils. Dispersive elements for encoding and decoding are in this case optically identical. In this case, a copy image, in particular a true-color copy image, of an original image, having a width of approximately 10 cm, is visible at a distance of about 1.4 m from the screen. Here a red spectral band of the copy image of the original image will comprise, for example, a wavelength range of approximately 600 nm to approximately 670 nm, and/or a green one will comprise a wavelength range of approximately 515 nm to approximately 585 nm, and/or a blue one will comprise a wavelength range of approximately 430 nm to approximately 500 nm. Alternatively or additionally the use of a viewing window, in particular a planar, curved and/or cylindrical viewing window, with corresponding diffraction foils, is conceivable. It is here conceivable to dispense with pre-distortion, in particular due to a precise adaptation of the applied components and distances to one another.

The use of dispersive elements with considerably higher line densities is also conceivable, e.g. with approximately 4200 lines/mm for blue light, with approximately 3600 lines/mm for green light and with approximately 3060 lines/mm for red light. Here a sizable deflection of projected light is achievable allowing, for example, a de-coupling of light from a projection unit sidewise with respect to a projection direction of a light source. In case of a minimum deflection of approximately 152°, and in particular for a projection onto an at least substantially one-dimensional screen, in particular in this case, for example, a copy image of an original image will appear at a distance of approximately 1.4 m in an angle range of approximately 12°, which corresponds to a width of the copy image of the original image of approximately 30 cm. This advantageously allows achieving a compact construction. It is furthermore possible to realize a broad copy image at a short distance.

Of course any further arrangements, in particular also in a combination with differently implemented screens, are also conceivable. Moreover a color mixing is conceivable that differs from an RGB color mixing.

The invention claimed is:

1. A method for generating a spectrally encoded image from an original image, comprising:
   at least one first transformation step, in which at least one first original image parameter is encoded into at least one first image parameter, which is dependent on at least one spectral coordinate of the spectrally encoded image, wherein the original image comprises at least one first partial image, which is encoded into a first basis image and comprises a first spectral band, wherein
   the first original image parameter is a light intensity distribution that is dependent on a location coordinate of the original image and extends over the first spectral band, wherein
   the first original image parameter implements an image line of the first partial image of the original image, and wherein
   the first image parameter is a light intensity distribution that is dependent on the spectral coordinate of the spectrally encoded image in the first spectral band, wherein
   the spectrally encoded image is generated on a one-dimensional screen via a projection onto the one-dimensional screen and/or is coupled into the one-dimensional screen sidewise and/or from below, and wherein
   the spectrally encoded image is spatially at least substantially one-dimensional; and
   at least one second transformation step, in which at least one second original image parameter is encoded into at least one second image parameter that is dependent on the spectral coordinate of the spectrally encoded image, wherein
   the original image comprises at least one second partial image, which is encoded into a second basis image and comprises a second spectral band, wherein
   the second original image parameter is a light intensity distribution that is dependent on the location coordinate of the original image and extends over the second spectral band, wherein
   the second original image parameter implements an image line of the second partial image of the original image, wherein
   the second image parameter is a light intensity distribution that is dependent on the spectral coordinate of the spectrally encoded image in the second spectral band, wherein
   at least in the first transformation step and/or at least in the second transformation step, the original image parameter is translated into the image parameter via dispersion and/or via filtration and/or in a computer-based fashion, wherein
   the first transformation step and the second transformation step are carried out with different dispersive elements, which in particular comprise at least an optical grating and/or at least a prism, or wherein the first transformation step and/or the second transformation step are/is carried out at least with a Spatial Light Modulator, wherein the spectrally encoded image is generated as a superposition of different basis images and wherein the first transformation step is carried out in a different spectral band than the second transformation step.

2. A method for decoding a spectrally encoded image for the purpose of generating a copy image of an original image, comprising:

at least one first transformation step, in which at least one first copy image parameter is decoded from at least one first image, which is dependent on at least one spectral coordinate of the spectrally encoded image, wherein the copy image of the original image comprises a first elementary image comprising a first spectral band and comprising at least the first copy image parameter, wherein the first copy image parameter is a light intensity distribution that is dependent on a location coordinate of the copy image and extends over the first spectral band, wherein the first copy image parameter implements an image line of the first elementary image, and wherein the first image parameter is a light intensity distribution that is dependent on the spectral coordinate of the spectrally encoded image in the first spectral band, and wherein the spectrally encoded image is spatially at least substantially one-dimensional, wherein at least one second transformation step, in which at least one second copy image parameter is decoded from at least one second image parameter which is dependent on the spectral coordinate of the spectrally encoded image wherein the copy image of the original image comprises a second elementary image comprising a second spectral band and comprising at least the second copy image parameter, wherein the second copy image parameter is a light intensity distribution that is dependent on the location coordinate of the copy image and extends over the second spectral band, wherein the second copy image parameter implements an image line of the second elementary image, wherein the second image parameter is a light intensity distribution that is dependent on the spectral coordinate of the spectrally encoded image in the second spectral band, wherein at least in the first transformation step and/or at least in the second transformation step the image parameter is translated into the copy image parameter, wherein the first transformation step and/or the second transformation step are/is carried out with at least one dispersive element, wherein the first transformation step and the second transformation step are carried out with different dispersive elements, wherein the dispersive elements comprise at least an optical grating and/or at least a prism, wherein the dispersive elements have different spatial orientations relative to the original image and/or to the spectrally encoded image, and/or wherein the dispersive elements are made of different materials and/or have different geometries, and/or wherein positions of the dispersive elements relative to each other are adapted in any required fashion, wherein in the method for decoding the spectrally encoded image, the dispersive elements are arranged between a screen and a viewer, wherein the light on the screen corresponds to stacks of different image strips having different spectral colors; wherein in a viewing through the different dispersive elements, sheared-off stacks result, wherein due to a partial superposing of the sheared-off stacks, the image strips, which are arranged in a row, are superposed to form elementary images of the copy image of the original image, and wherein the copy image of the original image is generated via a superposition of elementary images.

3. The method according to claim 1, wherein the dispersive elements are arranged at least partially directly one behind the other one.

4. The method according to claim 3, wherein the dispersive elements are arranged at least partially side by side.

5. The method according to claim 1, further comprising at least one third transformation step, which is carried out in a different spectral band than the first and second transformation steps.

6. The method according to claim 1, wherein the different spectral bands each correspond to a respective basis color.

7. The method according to claim 1, wherein the spectrally encoded image comprises a plurality of basis images with different basis colors, which together encode the original image at least approximately in true-color fashion.

8. An encoding device for the purpose of generating a spectrally encoded image from an original image by the method according to claim 1, comprising:

at least one encoding unit configured for an encoding of at least one first original image parameter into at least one first image parameter which is dependent on at least one spectral coordinate of the spectrally encoded image, wherein the original image comprises at least one first partial image, which is encoded into a first basis image and comprises a first spectral band, wherein the first original image parameter is a light intensity distribution that is dependent on a location coordinate of the original image and extends over the first spectral band, wherein the first original image parameter implements an image line of the first partial image of the original image, and wherein the first image parameter is a light intensity distribution that is dependent on the spectral coordinate of the spectrally encoded image in the first spectral band, wherein the encoding unit is configured for an encoding of a second original image parameter into at least one second image parameter which is dependent on the spectral coordinate of the spectrally encoded image, wherein the original image comprises at least one second partial image, which is encoded into a second basis image and comprises a second spectral band, wherein the second original image parameter is a light intensity distribution that is dependent on the location coordinate of the original image and extends over the second spectral band, wherein the second original image parameter implements an image line of the second partial image of the original image, and wherein the second image parameter is a light intensity distribution that is dependent on the spectral coordinate of the spectrally encoded image in the second spectral band, wherein the encoding device comprises at least one first dispersive element with at least an optical grating and/or with at least a prism, and comprises at least one second dispersive element with at least an optical grating and/or with at least a prism, and/or wherein the encoding device comprises at least one Spatial Light Modulator, and wherein the encoding unit comprises-a the one-dimensional screen, which the spectrally encoded image is projected onto and/or which the spectrally encoded image is coupled into sidewise and/or from below.

9. A decoding device for the purpose of generating a copy image of an original image from a spectrally encoded image by a method according to claim 2, comprising:

at least one decoding unit configured for a decoding of at least one first copy image parameter from at least one first image parameter which is dependent on at least one spectral coordinate of the spectrally encoded image, wherein the copy image of the original image comprises a first elementary image comprising a first spectral band and comprising at least the first copy image parameter, wherein the first copy image parameter is a light intensity distribution that is dependent on a location coordinate of the copy image and extends over the first spectral band, wherein the first copy image parameter implements an image line of the first elementary image, and wherein the first image parameter is a light intensity distribution that is dependent on the spectral coordinate of the spectrally encoded image in the first spectral band, wherein the decoding unit is configured for a decoding of at least one second copy image parameter from at least one second image parameter which is dependent on the spectral coordinate of the spectrally encoded image, wherein the copy image of the original image comprises a second elementary image comprising a second spectral band and comprising at least the second copy image parameter, wherein the second copy image parameter is a light intensity distribution that is dependent on the location coordinate of the copy image and extends over the second spectral band, wherein the second copy image parameter implements an image line of the second elementary image, and wherein the second image parameter is a light intensity distribution that is dependent on the spectral coordinate of the spectrally encoded image in the second spectral band, wherein the decoding device comprises at least one dispersive element, wherein the decoding device comprises at least one second dispersive element, wherein the dispersive elements comprise at least an optical grating and/or at least a prism, wherein the dispersive elements have different spatial orientations relative to the original image and/or to the spectrally encoded image, and/or wherein the dispersive elements are made of different materials and/or have different geometries, and/or wherein positions of the dispersive elements relative to each other are adaptable as required.

* * * * *